United States Patent
Ramani et al.

(10) Patent No.: US 6,924,820 B2
(45) Date of Patent: Aug. 2, 2005

(54) OVER-EVALUATING SAMPLES DURING RASTERIZATION FOR IMPROVED DATAPATH UTILIZATION

(75) Inventors: Nandini Ramani, Saratoga, CA (US); David C. Kehlet, Los Altos, CA (US); Michael G. Lavelle, Saratoga, CA (US); Mark E. Pascual, San Jose, CA (US); Ewa M. Kubalska, San Jose, CA (US); Yi-Ming Tian, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 138 days.

(21) Appl. No.: 09/962,995

(22) Filed: Sep. 25, 2001

(65) Prior Publication Data

US 2003/0058244 A1 Mar. 27, 2003

(51) Int. Cl.[7] ................................................ G09G 5/00
(52) U.S. Cl. ...................................... 345/619; 345/629
(58) Field of Search ................................. 345/619, 629, 345/441, 419, 581, 620, 506

(56) References Cited

U.S. PATENT DOCUMENTS

| 6,424,343 | B1 | | 7/2002 | Deering et al. | |
| 6,480,205 | B1 | * | 11/2002 | Greene et al. | 345/631 |
| 6,567,087 | B1 | * | 5/2003 | Reid | 345/428 |
| 6,597,363 | B1 | * | 7/2003 | Duluk et al. | 345/506 |
| 6,812,923 | B2 | * | 11/2004 | Gosalia et al. | 345/419 |
| 2002/0171653 | A1 | | 11/2002 | Lavelle et al. | |
| 2002/0180747 | A1 | * | 12/2002 | Lavelle et al. | 345/581 |
| 2002/0196251 | A1 | * | 12/2002 | Duluk et al. | 345/420 |
| 2003/0122815 | A1 | * | 7/2003 | Deering | 345/419 |
| 2003/0137514 | A1 | * | 7/2003 | Nelson | 345/441 |

* cited by examiner

Primary Examiner—Michael Razavi
Assistant Examiner—Javid Amini
(74) Attorney, Agent, or Firm—Meyertons Hood Kivlin Kowert & Goetzel, P.C.; Jeffrey C. Hood

(57) ABSTRACT

A system and method for rasterizing and rendering graphics data is disclosed. Vertices may be grouped to form primitives such as triangles, which are rasterized using two-dimensional arrays of samples bins. To overcome fragmentation problems, the system's sample evaluation hardware may be configured to over-evaluate samples each clock cycle. Since a number of the samples will typically not survive evaluation because they will be outside the primitive being rendered, the remaining surviving samples may be combined into sets, with one set being forwarded to subsequent pipeline stages each clock cycle in order to attempt to keep the pipeline utilization high.

23 Claims, 21 Drawing Sheets

FIG. 1 - PRIOR ART

| FILL RATE OF TILE MERGING UNIT IN PIXELS/CLK | | | | | | | | |
|---|---|---|---|---|---|---|---|---|
| TRIANGLE SIZE (IN PIXELS) | FIFO DEPTH | | | | | | | |
|  | 2 | 3 | 4 | 5 | 6 | 7 | 8 | 12 |
| 25 | 2.83 | 2.97 | 3.05 | 3.07 | 3.1 | 3.12 | 3.15 | 3.19 |
| 10 | 2.54 | 2.72 | 2.74 | 2.75 | | | | |
| 5 | 2.26 | 2.33 | 2.33 | | | | | |
| 1 | 1.4 | | | | | | | |

FIG. 9

| FILL RATE OF TILE MERGING UNIT IN MILLION TRIANGLES/SEC. | | | | | | | | |
|---|---|---|---|---|---|---|---|---|
| TRIANGLE SIZE (IN PIXELS) | FIFO DEPTH | | | | | | | |
|  | 2 | 3 | 4 | 5 | 6 | 7 | 8 | 12 |
| 25 | 20.39 | 21.42 | 21.97 | 22.16 | 22.35 | 22.46 | 22.69 | 23 |
| 10 | 45.86 | 49.1 | 49.37 | 49.51 | | | | |
| 5 | 81.61 | 83.88 | | | | | | |
| 1 | 253 | | | | | | | |

FIG. 10

| MODULE | 1-4 PIX | 5 PIX | 10 PIX | 25 PIX |
|---|---|---|---|---|
| SU | 3.4 CLKS/PRIM | | | |
| EW | 1 CLK/PRIM | 1.5 CLK/PRIM | 2 CLK/PRIM | 3.3 CLK/PRIM |
| SW | 1-3.8 PIX/CLK | 4.7 PIX/CLK | 5.6 PIX/CLK | 6.75 PIX/CLK |
| TMU | 1-2.6 PIX/CLK | 2.64 PIX/CLK | 3.14 PIX/CLK | 3.3 PIX/CLK |

FIG. 12

| MODULE | 1-4 PIX | 5 PIX | 10 PIX | 25 PIX |
|---|---|---|---|---|
| SU | 73.53 M TRI / SEC | | | |
| EW | 250 M TRI / SEC | 166 M TRI / SEC | 125 M TRI / SEC | 75.7 M TRI / SEC |
| SW | 235 M TRI / SEC | 235 M TRI / SEC | 133 M TRI / SEC | 67.5 M TRI / SEC |
| TMU | 162 M TRI / SEC | 130 M TRI / SEC | 78 M TRI / SEC | 32.9 M TRI / SEC |

FIG. 13

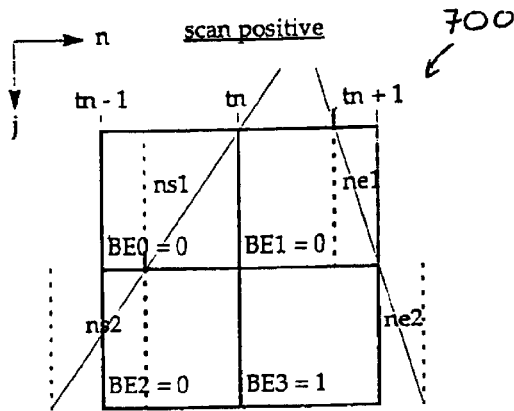

scan positive 700

| NSS | SS |
|---|---|
| Left (Top) Edge | Left (Top) Edge |
| BE0 = (tn - 1 > ns1) | BE0 = (tn > ns1) |
| BE1 = (tn > ns1) | BE1 = (tn + 1 > ns1) |
| BE2 = (tn - 1 > ns2) | BE2 = (tn > ns2) |
| BE3 = (tn > ns2) | BE3 = (tn + 1 > ns2) |
| Right (Bottom) Edge | Right (Bottom) Edge |
| BE0 = (tn - 1 <= ne1) | BE0 = (tn - 1 <= ne1) |
| BE1 = (tn <= ne1) | BE1 = (tn <= ne1) |
| BE2 = (tn - 1 <= ne2) | BE2 = (tn - 1 <= ne2) |
| BE3 = (tn <= ne2) | BE3 = (tn <= ne2) |

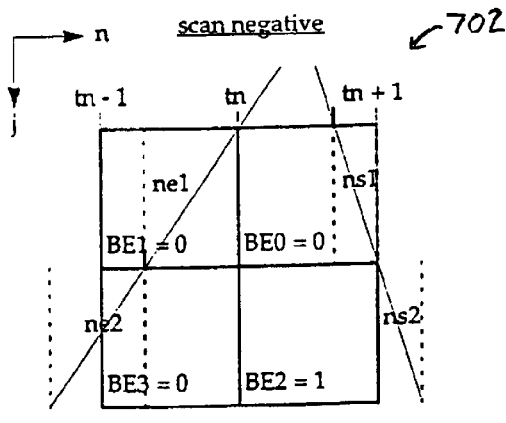

scan negative 702

| NSS | SS |
|---|---|
| Left (Top) Edge | Left (Top) Edge |
| BE0 = (tn > ne1) | BE0 = (tn + 1 > ne1) |
| BE1 = (tn - 1 > ne1) | BE1 = (tn > ne1) |
| BE2 = (tn > ne2) | BE2 = (tn + 1 > ne2) |
| BE3 = (tn - 1 > ne2) | BE3 = (tn > ne2) |
| Right (Bottom) Edge | Right (Bottom) Edge |
| BE0 = (tn <= ns1) | BE0 = (tn <= ns1) |
| BE1 = (tn - 1 <= ns1) | BE1 = (tn - 1 <= ns1) |
| BE2 = (tn <= ns2) | BE2 = (tn <= ns2) |
| BE3 = (tn - 1 <= ns2) | BE3 = (tn - 1 <= ns2) |

FIG. 19

OVER-EVALUATING SAMPLES DURING RASTERIZATION FOR IMPROVED DATAPATH UTILIZATION

BACKGROUND OF THE INVENTION

1. Field of the Invention

The present invention generally relates to the field of computer graphics systems. More particularly, the present invention relates to rasterization and fill rate optimization within computer graphics systems.

2. Description of the Related Art

Modern graphics systems have been rapidly increasing their performance as the result of ever higher clock speeds and improved levels of integration. Smaller feature sizes on integrated circuits and higher clock frequencies have led to significant increases in the both number of triangles that may be rendered per frame and the number of frames that may be rendered per second.

However, new applications such as three-dimensional (3D) modeling, virtual reality, and 3D computer games continue to demand even greater performance from graphics systems. Thus, system designers have continued to improve performance throughout the entire graphics system pipeline to try and meet the performance needs of these new applications.

FIG. 1 illustrates one example of a generic graphics system, but numerous variations are possible and contemplated. As shown in the figure, the system is a pipeline in which graphics data is initially read from a computer system's main memory into the graphics system. The graphics data may include geometric primitives such as polygons, NURBS (Non-Uniform Rational B-Splines), sub-division surfaces, voxels (volume elements) and other types of data. The various types of data are typically converted into triangles (e.g., three vertices having at least position and color information). Then, transform and lighting calculation units 50 receive and process the triangles. Transform calculations typically include changing a triangle's coordinate axis, while lighting calculations typically determine what effect, if any, lighting has on the color of triangle's vertices. The transformed and lit triangles are then conveyed to a clip test/back face culling unit 52 that determines which triangles are outside the current parameters for visibility (e.g., triangles that are off screen). These triangles are typically discarded to prevent additional system resources from being spent on non-visible triangles.

Next, the triangles that pass the clip test and back-face culling are translated into screen space 54. The screen space triangles are then forwarded to the set-up and draw processor 56 for rasterization. Rasterization typically refers to the process of generating actual pixels by interpolation from the vertices. In some cases samples are generated by the rasterization process instead of pixels. A pixel typically has a one-to-one correlation with the hardware pixels present in a display device, while samples are typically more numerous than the hardware elements and need not have any direct correlation to the display device. Regardless of whether pixels or samples are used, once drawn they are stored into a frame buffer 58.

Next, the pixels are read from frame buffer 58 and converted into an analog video signal by digital-to-analog converters 60. If samples are used, the samples are read out of frame buffer 58 and filtered to generate pixels, which are stored and later conveyed to digital to analog converters 60.

The video signal from converters 60 is conveyed to a display device 62 such as a computer monitor, LCD display, or projector.

As noted above, many applications place great demands on graphics systems. In some graphics systems, the rasterization algorithm is configured to calculate multiple pixels/samples per clock cycle called "tiles". Unfortunately, this can lead to less than ideal datapath utilization due to an effect called fragmentation. Fragmentation occurs when a portion of the rasterization hardware is assigned to areas outside of the geometry currently being rasterized. For example, a rasterization algorithm that calculates tiles of two horizontally adjacent pixels per cycle may experience fragmentation when the geometry being rasterized has an odd width in pixels. The last cycle of rasterization on an odd width will have only one pixel to calculate. The adjacent pixel, being outside of the current geometry, will not be rendered. This causes an inefficiency as subsequent hardware in the pipeline will be unused for this tile's missing or disabled pixel. Thus, a system and method capable of improving fill rate performance with respect to fragmentation is desired.

SUMMARY

The problems set forth above may at least in part be solved or reduced in some embodiments by a system and method that are configured to over-evaluate samples. A system and method for rasterizing and rendering graphics data is disclosed. Vertices may be grouped to form primitives such as triangles, which are rasterized using two-dimensional arrays of samples bins. To overcome fragmentation problems, the system's sample evaluation hardware may be configured to over-evaluate samples each clock cycle. Since a number of the samples will typically not survive evaluation because they will be outside the primitive being rendered, the remaining surviving samples may be combined into sets, with one set being forwarded to subsequent pipeline stages each clock cycle in order to attempt to keep the pipeline utilization high.

In one embodiment, the method for rendering graphics data may include receiving a geometric primitive and selecting an N×M tile of sample bins at least partially intersecting the geometric primitive. N and M are positive integers, and at least one of N and M are greater than one. Next, one sample is selected from each sample bin in the N×M tile of bins for a first cycle. The selected samples are then forwarded for rendering. The rendered samples may be stored and then filtered into pixels. The pixels may be stored until they are output for display on a display device. Additional sets of samples may be selected from the tile in subsequent cycles until all samples in the tile have been selected and rendered.

In some embodiments, the method may also include determining whether each of the selected samples are inside the particular geometric primitive, and tagging the samples as being either inside or outside the particular geometric primitive. Furthermore, in some embodiments the method may include storing the selected samples to a FIFO (first in first out) memory. The stored samples may then be read from the FIFO memory and rendered. Once rendered, the samples may be filtered to form pixels which are displayable to form an image (e.g., on a display device such as a computer monitor). While each implementation may vary, in some embodiments N may be set to equal 2 and M may be set to equal 1. Similarly, in other embodiments N may be set to equal 2 or 4, and M may be set to equal 2 or 4. Depending on the implementation, the samples may include color, depth, and transparency (i.e., alpha) information.

In another embodiment, the method for rendering may include receiving a set of vertices, and selecting a tile of sample bins that overlap and edge joining at least two of the vertices. Next, one sample may be selected from each sample bin in the selected tile of bins. Each selected sample may advantageously be from a different memory bank to prevent blocking of memory resources in the rendering pipeline. Next, the selected samples may be rendered (e.g., to form pixels) in order to form an image that is displayable on a display device. The selecting and rendering may be repeated a number of times until all of the samples in the selected tile of bins have been rendered. For each selection cycle, however, the samples may be constrained such that they correspond to different memory banks. In one embodiment, each selection cycle may correspond to one clock cycle. In other embodiments, multiple clock cycles may be utilized for each selection and/or rendering cycle.

In some embodiments, the selected samples may be examined to determine whether or not they are in a geometric primitive (e.g., a triangle) formed by a set of vertices. The samples may be tagged to indicate whether or not they are inside or outside the primitive. Advantageously, the tagged samples may be stored to a FIFO memory that is configured to collapse or compact out samples that are invalid or empty (e.g., samples that are tagged as being outside the primitive). As noted above, in some embodiments the tile may be a two-dimensional array of bins, with each bin storing two or more samples. For example, in one embodiment the tiles may each comprise a 2×2, 4×4, or 5×5 array of bins, with each bin storing 16 samples. Note, in some embodiments having high pixel resolutions, pixel bins (i.e., bins of pixels) and tiles of pixel bins may be used in lieu of sample bins in the embodiments described above.

A graphics system for rendering graphics data is also contemplated. In one embodiment, the graphics system may comprise a memory configured to store graphics data including one or more geometric primitives (e.g., triangles, polygons, or other 2D shapes or 3D volumes). The graphics system may include set-up logic that is configured to select a tile of bins that at least partially intersect the geometric primitive. The tile of bins may be a two-dimensional array of bins, and each bin may correspond to a number of samples. The graphics system may also include a number of sample evaluation units configured to evaluate the selected samples from the set-up logic. The sample evaluation units may be configured to determine whether the selected samples from the set-up logic are within the geometric primitive, and thus worthy of rendering. The graphics system may also include, in some embodiments, a number of FIFO memories in a frame buffer. The sample evaluation units may be connected to the frame buffer and the FIFO memories. The frame buffer may include a number of memory banks, with each FIFO memory corresponding to one sample evaluation unit and one memory bank. The sample evaluation unit may also include a rendering unit configured to render selected samples that fall within the geometric primitive. Advantageously, the FIFO memories may be configured to shift out or collapse out samples that are outside the geometric primitive, thereby preventing the sample evaluation units from wasting resources for clock cycles on samples that are not going to be rendered.

BRIEF DESCRIPTION OF THE DRAWINGS

The foregoing, as well as other objects, features, and advantages of this invention may be more completely understood by reference to the following detailed description when read together with the accompanying drawings in which:

FIGS. 9–10 are tables illustrating sample performance characteristics for different FIFO memory sizes;

FIGS. 12–13 are tables illustrating sample performance characteristics for a sample graphics system that implements one embodiment of pixel packing;

FIGS. 19–21 depict different examples of bin enable calculations.

Figure 1:
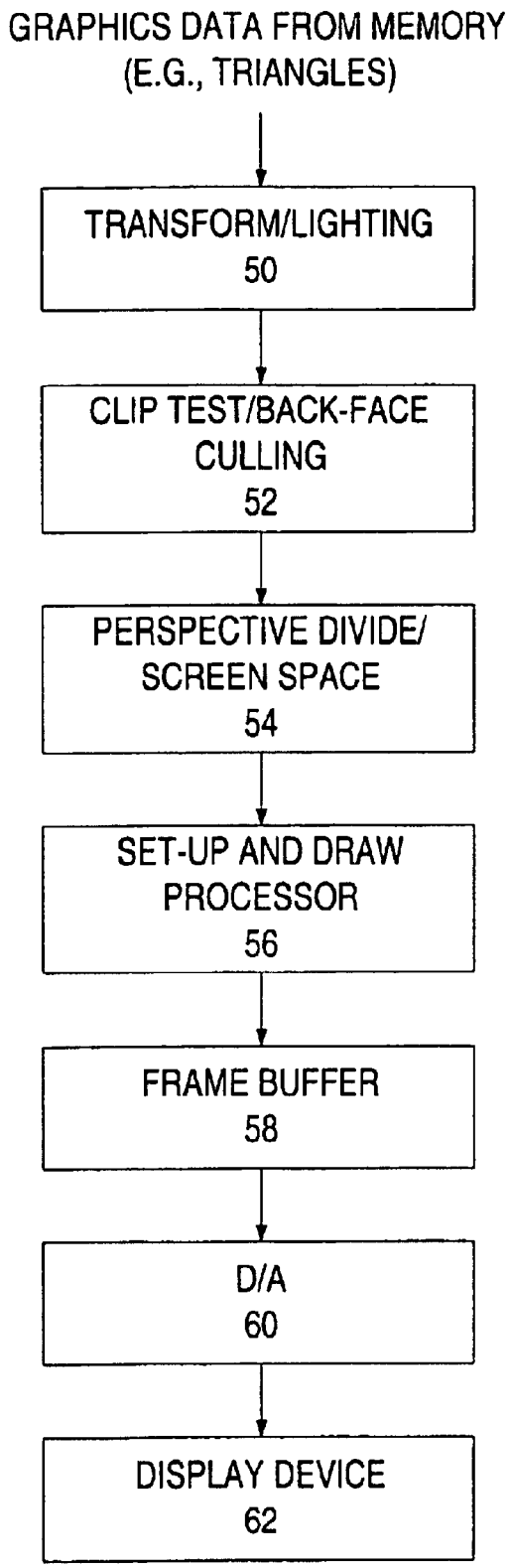
FIG. 1 is a block diagram of one embodiment of a graphics system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF SEVERAL EMBODIMENTS

Figure 2:
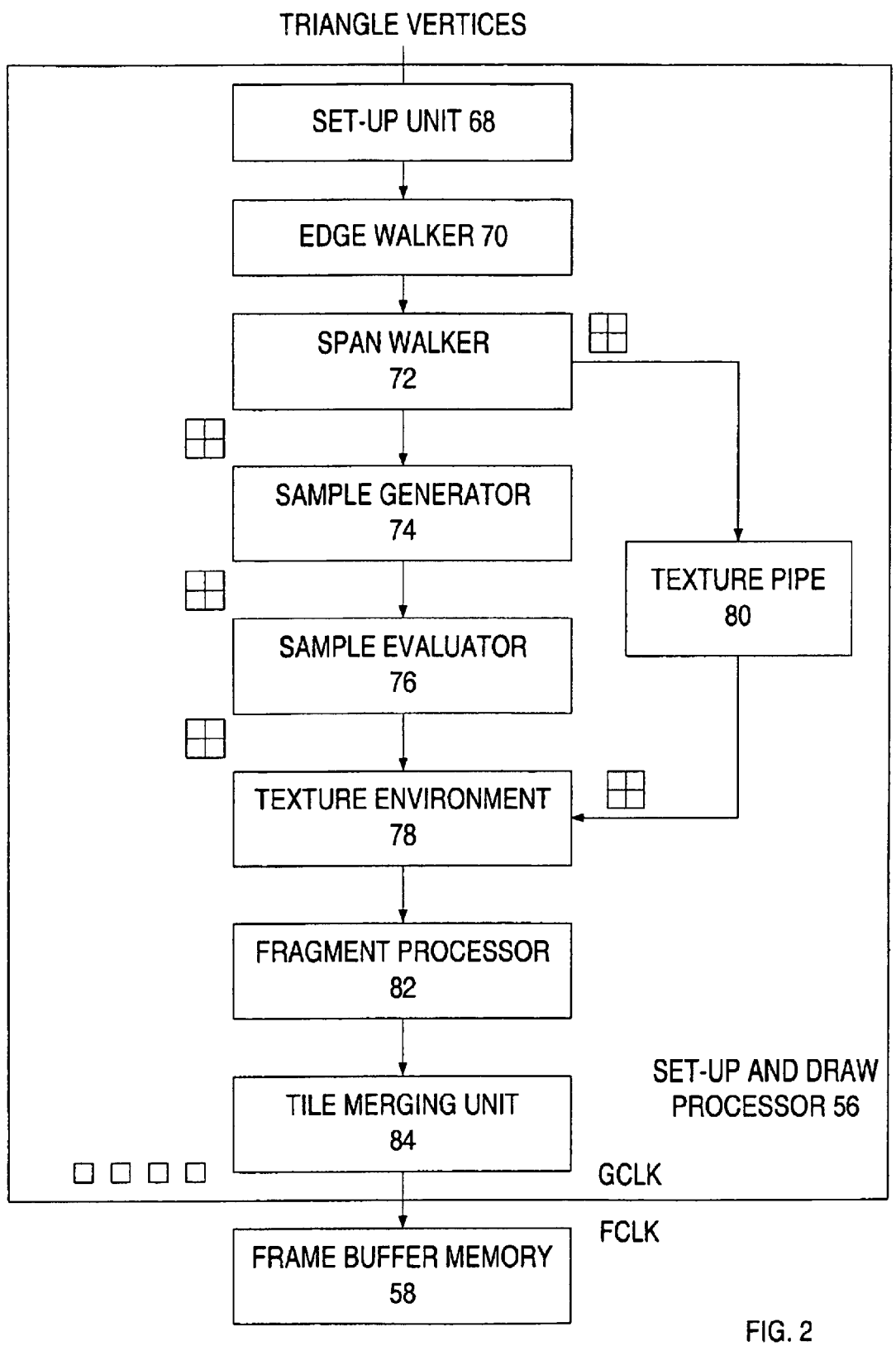
FIG. 2 is a diagram of one embodiment of a set-up and draw processor that be used to implement one embodiment of the systems and methods described herein.

Turning now to FIG. 2, details of one embodiment of a set-up and draw processor 56 configured to use tiles are shown. As the figure illustrates, set-up and draw processor 56 receives triangle vertices e.g., position information such as x and y coordinates) along with associated data (e.g., color and alpha information). The set-up unit 68 computes edge slopes and plane slopes that are used to setup the triangle for walking. This information is passed down to edge walker 70 along with the vertex data. Edge walker 70 walks along the major edge of the triangle generating two spans per clock cycle. These spans are then conveyed to span walker 72. Span walker 72 generates 2×2 tiles along with vertex and slope information. Sample generator 74 receives this information and generates samples, which are then evaluated in sample evaluator 76.

Texture pipe 80 is configured to generate texture information for the tiles proceeding in parallel through the sample generator 74 and sample evaluator 76. Texture environment unit 78 is configured to synchronize the information from sample evaluator 76 and texture pipe 80. Blending, depth cueing, and fog are applied in fragment processor 82. The tiles are conveyed to tile merging unit 84, which is configured to selectively shift pixels (or samples) to increase the percentage of full tiles. The tiles are then output from the set-up and draw processor 56 and stored into frame buffer memory 58.

As shown in the figure, set-up and draw processor 56 is configured to operate on a different clock frequency than frame buffer memory 58. Advantageously, by operating the set-up and draw processor at a faster clock GCLK than the frame buffer clock FCLK, average frame buffer memory write bandwidth utilization may be increased. For example, GCLK may be set to 225 MHz and FCLK may be set to 180 MHz. Effectively, the set-up and draw processor works ahead of the frame buffer to build up a number of tiles within a FIFO memory in tile merging unit 84. The tiles are written into tile merging unit 84 more quickly than they are read out for storage in frame buffer memory 58. However, the tiles written into tile merging unit 84 have a higher number of empty pixel positions. Tile merging unit 84 is configured to shift pixels from newer tiles to older tiles in an effort to reduce the number of empty pixel positions in the tiles that are written to frame buffer memory 58. Occasionally, this shifting may result in one or more completely empty tiles or bubbles performing in the FIFO. These bubbles are removed by the shifting action of the tile merging unit. Thus, while the tiles are written into tile merging unit 84 more quickly than they are read out, the number of tiles read out is less than the number of tiles written into the tile merging unit 84. As a result, the net number of pixels written into and read out of tile merging unit 84 remains the same.

Stated differently, tile merging unit 84 is configured to take a higher frequency set of data with gaps and selectively shift out the gaps to output a lower frequency set of data with fewer gaps. Advantageously, this serves to improve frame buffer bandwidth utilization, thereby reducing the need to unnecessarily increase the operating frequency of the frame buffer.

Figure 3A:
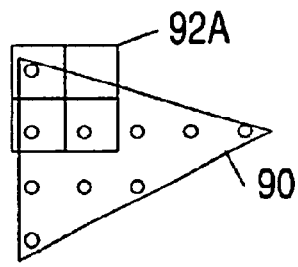
FIGS. 3A–E are examples of one embodiment of a rasterization technique using tiles.
Figure 3B:
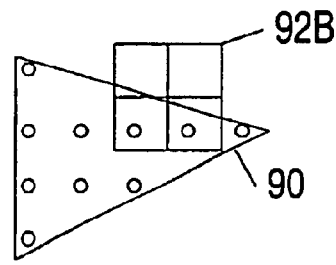
Figure 3C:
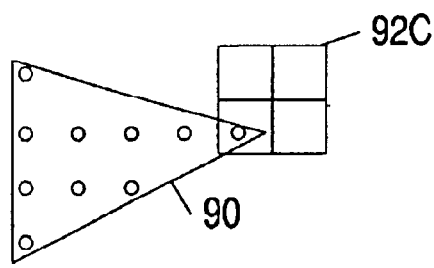
Figure 3D:
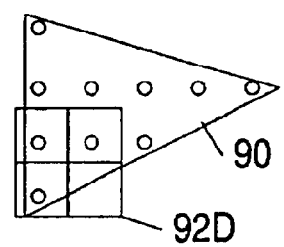
Figure 3E:
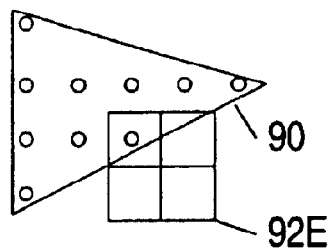

Turning now to FIGS. 3A–3E, one example of tile-based rasterization is illustrated. In this example, setup and draw processor 56 is configured to rasterize triangles into tiles having two by two (2×2) pixels. In FIG. 3A, the rasterization process has just started, with tile 92A positioned at the three first pixel positions in triangle 90. Tile 92A has one empty pixel position. As the figure illustrates, tile 92A will have one pixel position that is empty. Proceeding now to FIG. 3B, the second tile 92B of the rasterization process is illustrated. Tile 92B has two empty pixel positions. FIGS. 3C–3E illustrate the continuation of the rasterization process by generating tiles 92C, 92D, and 92E respectively. As shown by figures, tiles 92C and 92E each have three empty pixel positions, while tile 92D has one empty pixel position.

This example clearly illustrates that if the tiles are written into frame buffer 58 in the same form as they are generated, frame buffer write bandwidth would be less than optimal. The problem tiles are typically those located at the periphery of the triangle. With very large triangles, the percentage of tiles with one or more empty pixel positions may be small enough not to warrant any additional hardware to remedy the problem. However, as rendering performance has increased, so too has the demand for increasingly realistic 3D scenes. One common method for increasing the realism of a scene is to increase the number and reduce the size of polygons. Thus, the trend is to create more smaller triangles. This combined with demands for increased frame rates has the potential to cause severe bottlenecks at the frame buffer write stage of the pipeline.

Figure 4:
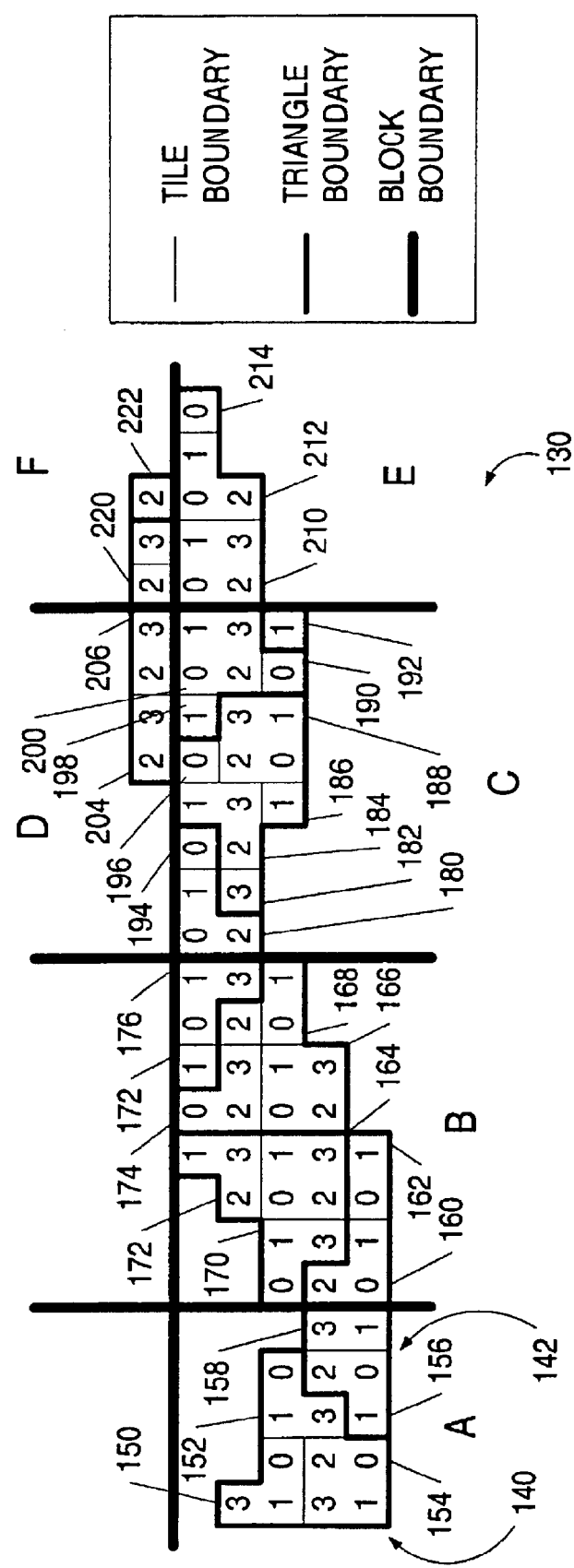
FIG. 4 is a diagram one embodiment of a triangle strip.

Turning now to FIG. 4, a detailed example of a typical triangle strip 130 to be rendered is shown. Strip 130 consists of a number of triangles that are rasterized into 2×2 tiles of pixels. For example, triangle 140 has ten pixels that are rasterized into tiles 150, 152, and 154. Similarly, triangle 142 has five pixels that are rasterized into tiles 156 and 158. A 2×2 pixel configuration for each tile may be used to guarantee that each of the four pixels within a tile is from a different interleave within the same memory block.

Many frame buffers are configured with pixel caches that serve to increase memory access bandwidth. For example, 3DRAM and 3DRAM-64 memories are types of memory used in frame buffers that have pixel caches. These pixel caches typically access a page of memory from the main frame buffer array. The pixel cache may be configured with hardware capable of performing read-modify-write (e.g., to implement alpha blending or z-compares). Once the page has been modified, the pixel cache may write the page back to the main frame buffer memory.

Many frame buffer memories are also configured into banks to support interleaving. For example, bank A may be accessed during a first clock cycle while bank B is refreshed, and then bank B may be accessed during a second clock cycle while bank A is being refreshed. Use of this configuration of frame buffer memory typically requires that a particular write to the frame buffer not cross memory bank boundaries. Each bank may have its own pixel cache, or one large pixel cache may have areas devoted to each memory bank.

Thus, in order to efficiently utilize the limited bandwidth available to the frame buffer, the set-up and draw processor may be configured to restrict tiles to a particular block of memory (to prevent page faults). The size and positioning of the block boundaries may be determined based on the configuration of the frame buffer memory. In FIG. 4, six blocks have been identified (i.e., blocks A, B, C, D, E, and F).

To further improve efficiency, the tiles may each have a number of defined pixel positions to support interleaved memory. For example, tile 154 has four pixel positions labeled 0, 1, 2, and 3. Each pixel in a 0 pixel position (regardless of which tile the pixel is in) may be stored to a first memory bank or interleave. Each pixel in a 1 pixel position may be stored to a second memory bank or interleave. Similarly, each pixel in a 2 and 3 pixel position may be stored to a third and fourth memory bank or interleave, respectively.

In one embodiment, the tiles are selected along a stripe, and the tile may move a half step (e.g., one bin width for a 2×2 tile of bins) or a full step (e.g., two bin widths for a 2×2 tile of bins). Other configurations with larger tile sizes are also possible and contemplated.

Figure 5A:
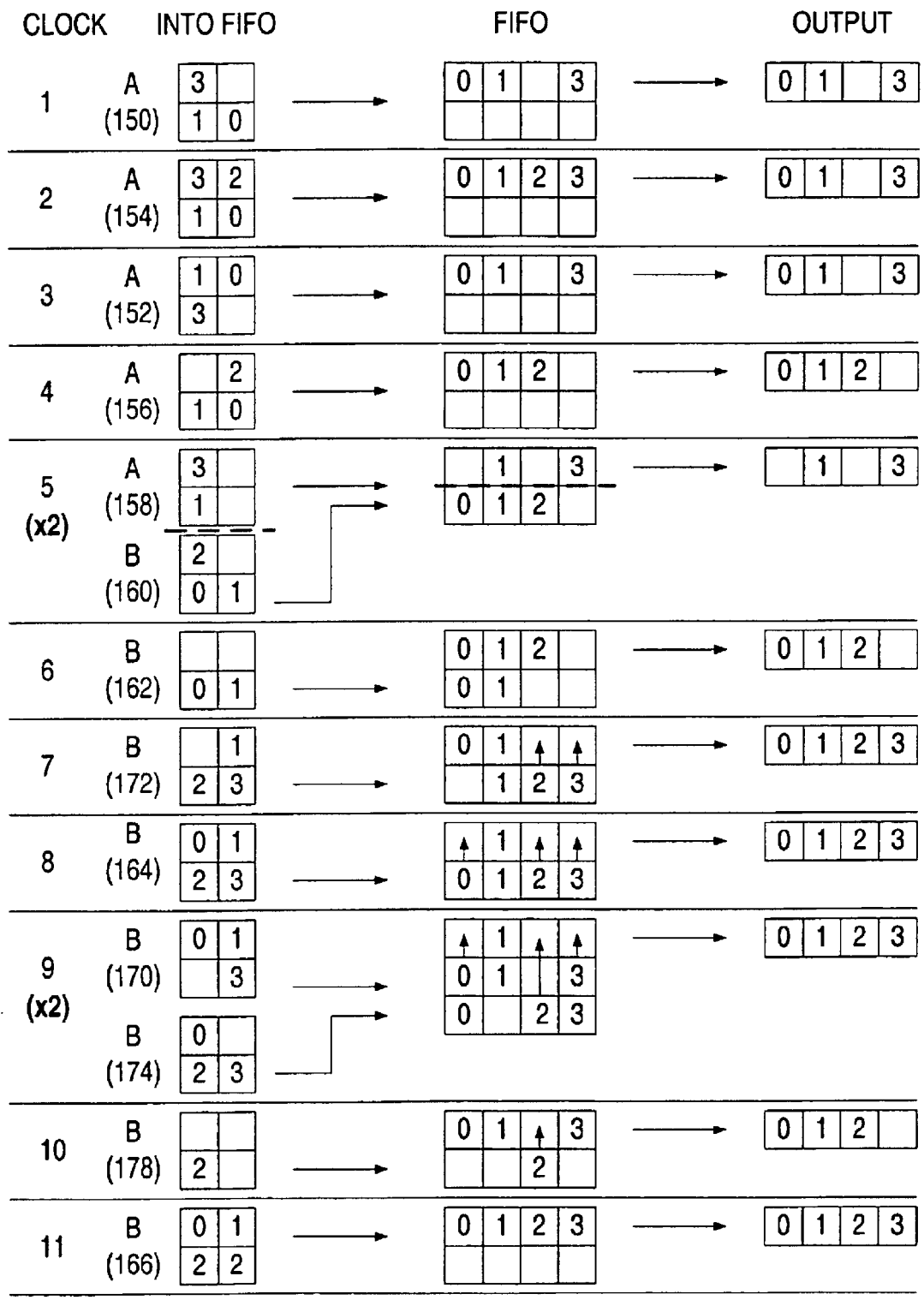
FIGS. 5A–C are a diagram illustrating one embodiment of a method for pixel packing.
Figure 5B:
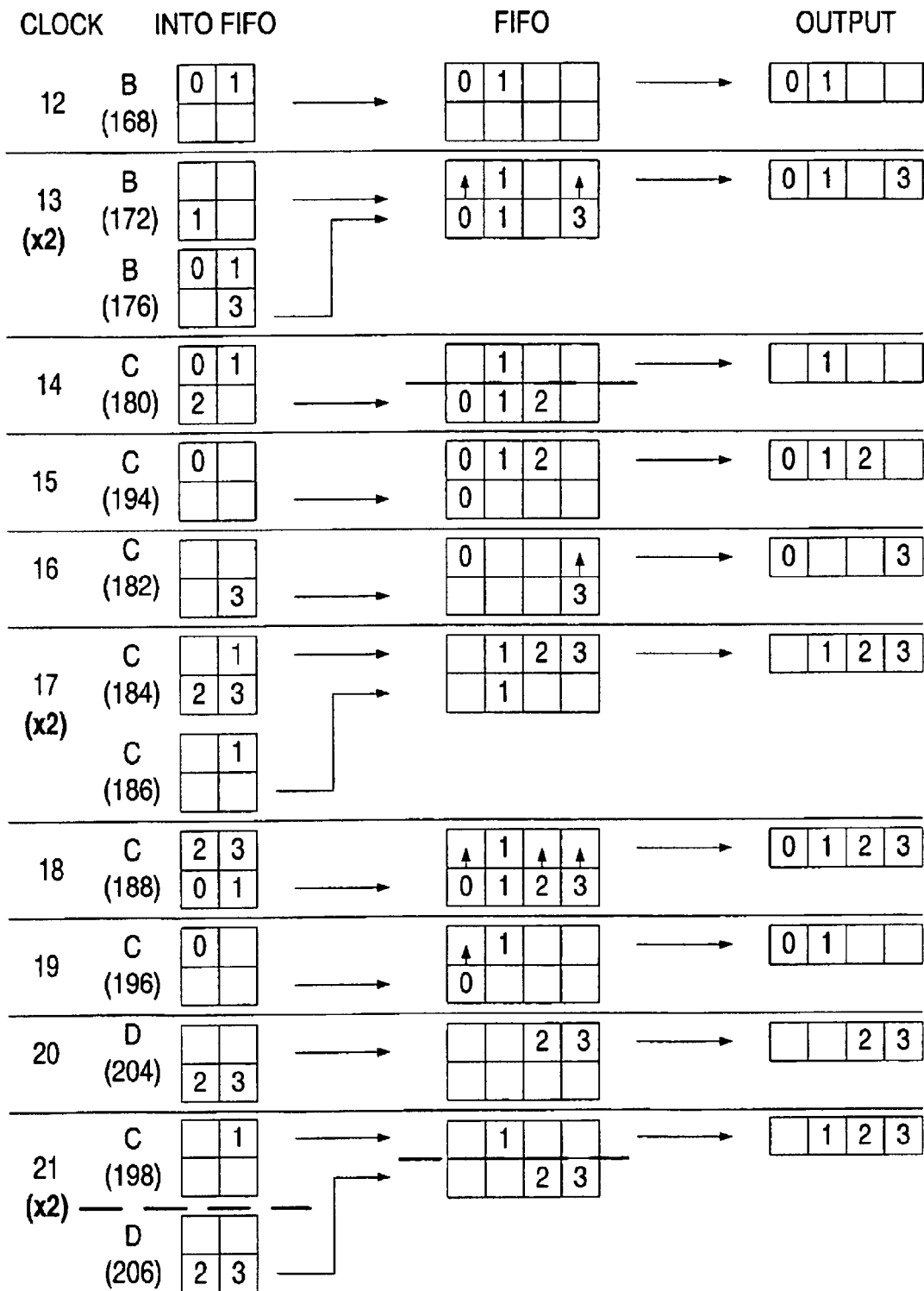
Figure 5C:
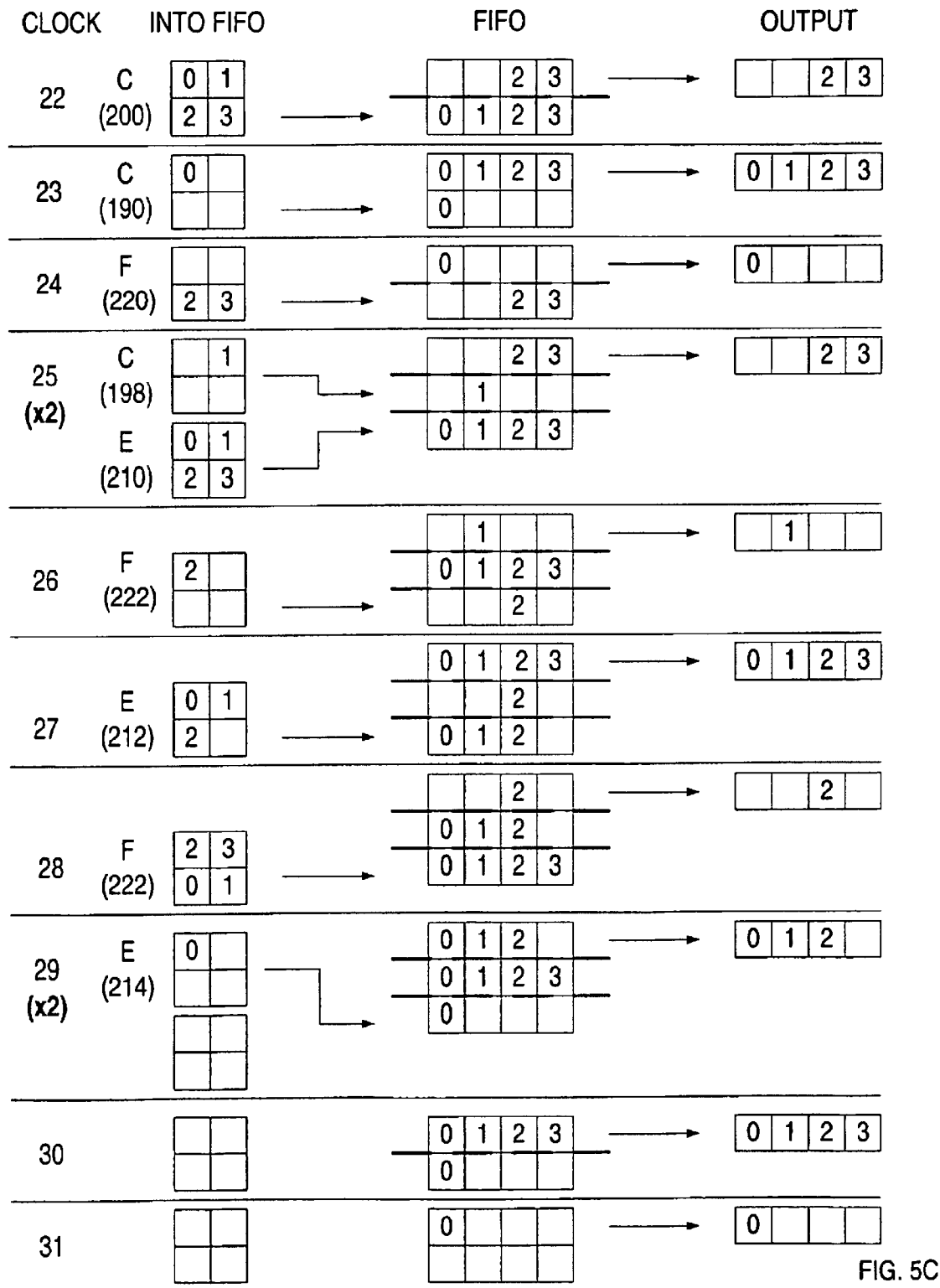

Turning now to FIGS. 5A–C, one embodiment of a method for pixel packing is illustrated. In this example, the contends of a FIFO memory within a time merging unit are illustrated along with the output of tile merging unit that is to be stored in a frame buffer. The method illustrates how the pixels from FIG. 4 may be pixel packed to improve the fill rate of a frame buffer. Starting with FIG. 5A, tile 150 is received by the tile merging unit as shown in clock cycle 1. The pixels from tile 150 may be output during the same clock, or there may be some latency (e.g., one clock cycle). This results in only 75% percent of the frame buffer bandwidth is used and no pixel packing being performed.

During the next three clock cycles (labeled 2–4), the tile merging unit receives pixels from tiles 154, 152, and 156. These are also output to the frame buffer as they are received. During clock cycle 5, however, the tile merging unit receives two tiles (i.e., tiles 158 and 160). This is due to the mismatch in GCLK and FCLK speeds. As noted above, the set-up and draw processor operates at GCLK (e.g., 225 MHz), while the tile merging unit's output operating at FCLK (e.g., 180 MHz) to match the operating frequency of the frame buffer write port. While different speed combinations of GCLK and FCLK may be used, the difference in speeds may influence what size of FIFO memory is selected and how effective the tile merging unit will be in pixel packing. In the example of FIGS. 5A–C, two tiles are received by the tile merging unit approximately every fourth cycle. If the tile merging unit's FIFO memory ever becomes full, it may be configured to cause a stall further up the set-up and draw processor's pipeline until more room can be freed in the FIFO.

Normally, pixel packing could occur in clock cycle 5 (i.e., the pixel from pixel position 0 in tile 160 could be shifted to fill the corresponding empty position in tile 158), but tiles 158 and 160 are from different blocks. Thus no shifting can take place, or an undesirable page fault could occur in the frame buffer. Instead, the pixels from tile 158 are output, and the pixels from tile 160 remain in the FIFO until the next clock cycle.

During clock cycle 6, the pixels from tile 160 are output while the pixels from tile 162 are received and stored in the FIFO. Pixel packing does not take place because tile 162 does not have a pixel for pixel position 3. If a pixel from tile 162's pixel position 0 or 1 is shifted into the pixel position 3 of tile 160, the pixels in tile 160 would not be from different interleaves. This could cause problems at the frame buffer because the write interface for each interleave is most likely optimized to receive only a single pixel for each interleave per clock cycle. Thus, no pixel packing takes place during clock cycle 6.

During clock cycle 7, however, tile 172 is received, and the pixels from tile 172's pixel positions 2 and 3 are shifted into the empty pixel positions from tile 170. Thus, four pixels are output to the frame buffer yielding full bandwidth utilization. The shifting/pixel packing function is illustrated by the arrows in the FIFO of clock cycle 7. The process of receiving tiles and selecting shifting pixels (when possible) continues from clock cycle 7 of FIG. 5A through clock cycle 31 of FIG. 5C.

The effect that pixel packing has on fill rate can be seen in clock cycle 28, at which time the tile merging unit has received approximately 34 tiles and output 28 tiles, with a merging efficiency of approximately 20%.

As noted above, shifting pixels from one block to another is not permitted in most embodiments. The tile merging unit may be configured to perform the following two divide operations in order to determine the block information for each tile: (i) [tile x coordinate/block_x size], and (ii) [tile y coordinate/block_y size]. For example, in one non-super-sampled embodiment the block_x size is 16 pixels and the block_y size is 8. In one non-super-sampled stereo embodiment (i.e., two images, one for each eye), the block_x size is 16 pixels and the block_y size is 4. Other sizes are also possible and contemplated.

Figure 6:
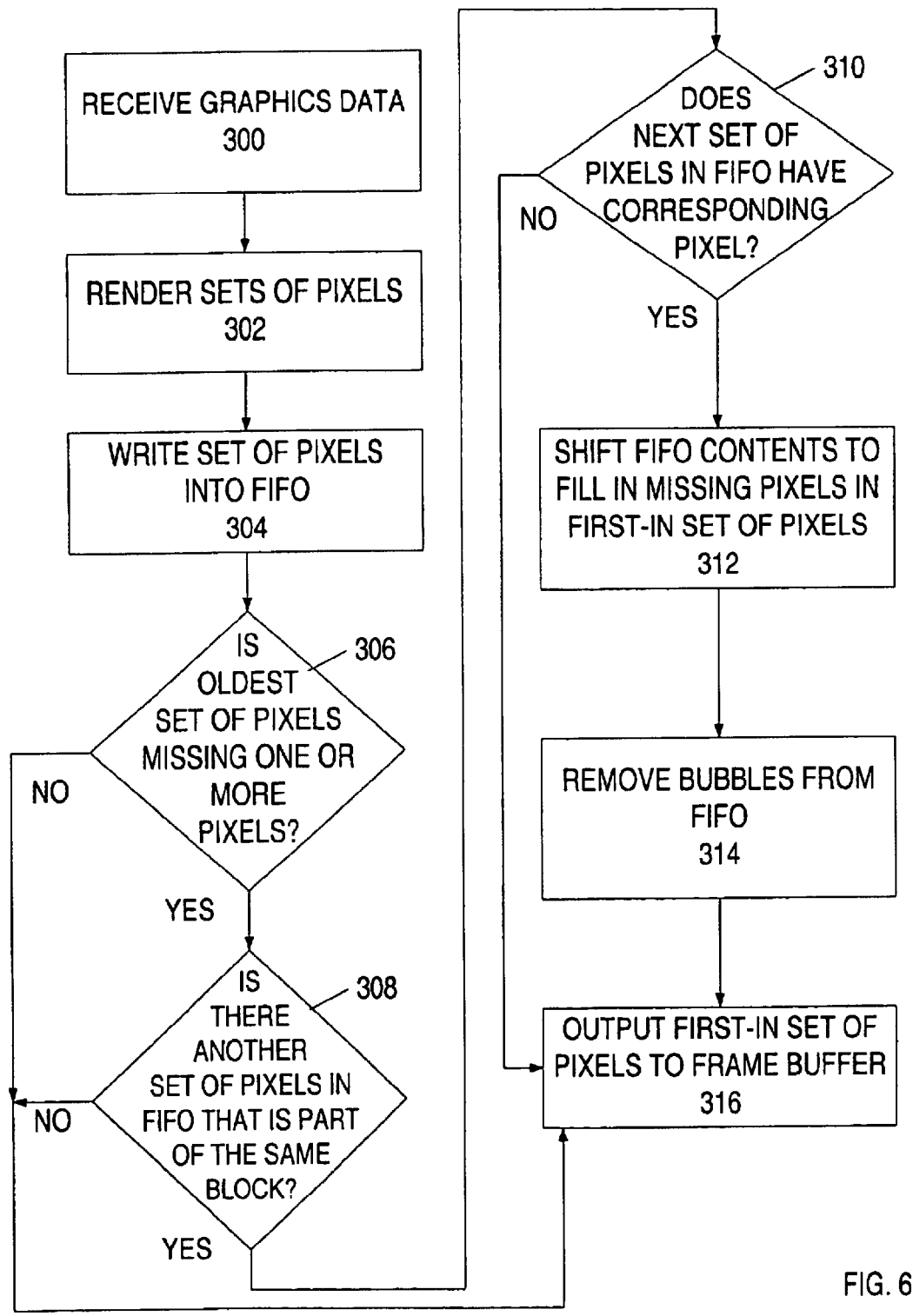
FIG. 6 is a flowchart illustrating another embodiment of a method for pixel packing.

Turning now to FIG. 6, a flowchart of one embodiment of a method for pixel packing is shown. First, graphics data is received by the graphics system (step 300). Next, the graphics data is separated into triangles, and the triangles are divided into pixels which are then grouped into tiles and rendered (step 302). Note, as used herein the term "set of pixels" and the term "tile" are used interchangeably to mean a group of pixels. As noted above, in the preferred embodiment the group of pixels are all within a common block and each belong to a different interleave.

Next, the tiles of pixels are forwarded to a FIFO, e.g., within a tile merging unit (step 304). The tiles in the FIFO are examined to determine whether the oldest received tile has any empty pixel positions (i.e., missing pixels) (step 306). If not, then there is no need to perform any pixel packing on this tile, and the FIFO may simply output the full tile "as-is" to the frame buffer (step 316). If, however, there are one or more empty pixel positions in the tile, then one or more other tiles in the FIFO may be examined to determine whether they are in the same block as the oldest tile (step 308). If no other tiles in the FIFO are within the same block, then in this embodiment there are no candidate pixels to be shifted. Thus, the oldest tile is output "as-is" to the frame buffer, i.e., with empty pixel positions (step 316). If, however, there are one or more tiles in the FIFO that are in the same block as the oldest tile, then those tiles are examined to determine if they have one or more pixels that correspond to the empty pixel position or positions in the oldest tile (step 310). As described above, in embodiments that interleave pixel writes to the frame buffer, only pixels that are of different interleaves may be pixel packed together. If any pixels meet the pixel packing criteria, they may be shifted into the oldest tile (step 312). Any empty tiles forming "bubbles" may be removed by shifting all tiles beyond the bubble by one position in the FIFO (step 314). The oldest tile, together with any newly packed pixels, is output for eventual storage in the frame buffer (step 316). In some embodiments, multiple set-up and draw units may be used, and corresponding switching logic may service as an interface between the multiple set-up and draw units and the frame buffer.

Note, FIG. 6 merely illustrates one possible embodiment of the method for pixel packing. Other embodiments are possible and contemplated. For example, additional criteria may be applied to the pixels that are candidates for pixel packing before the shifting actually takes place. Furthermore, different configurations of the FIFO may be utilized to implement different types of shifting. For example, referring back to FIG. 5A, in clock cycle 9, in one embodiment the pixel in pixel position 3 of tile 174 may be shifted forward to join the pixel of pixel position 1 of tile 170. In another embodiment, the pixel in pixel position 3 of tile 174 may remain unshifted (e.g., until clock cycle 10 at which time it could be shifted with the contents of tile 178). The method is preferably implemented in hardware, but a combination of hardware and software or software-only may also be possible in some embodiments.

In some embodiments, intervening tiles from other blocks may simply be ignored or skipped over during the pixel packing process. In other embodiments, tiles may be searched in time order beginning with the next-to-oldest and ending with the first tile that is from a different block. While greater flexibility is most likely preferable in the operation of the FIFO, in some cases reducing the hardware needed to control the FIFO or increasing the speed may dictate less flexible solutions. Similarly, in some embodiments pixels from multiple tiles may be combined into a single tile during a single clock cycle (see, e.g., clock cycle 9 of FIG. 5A), while in other embodiments certain timing restrictions may apply.

Figure 7:
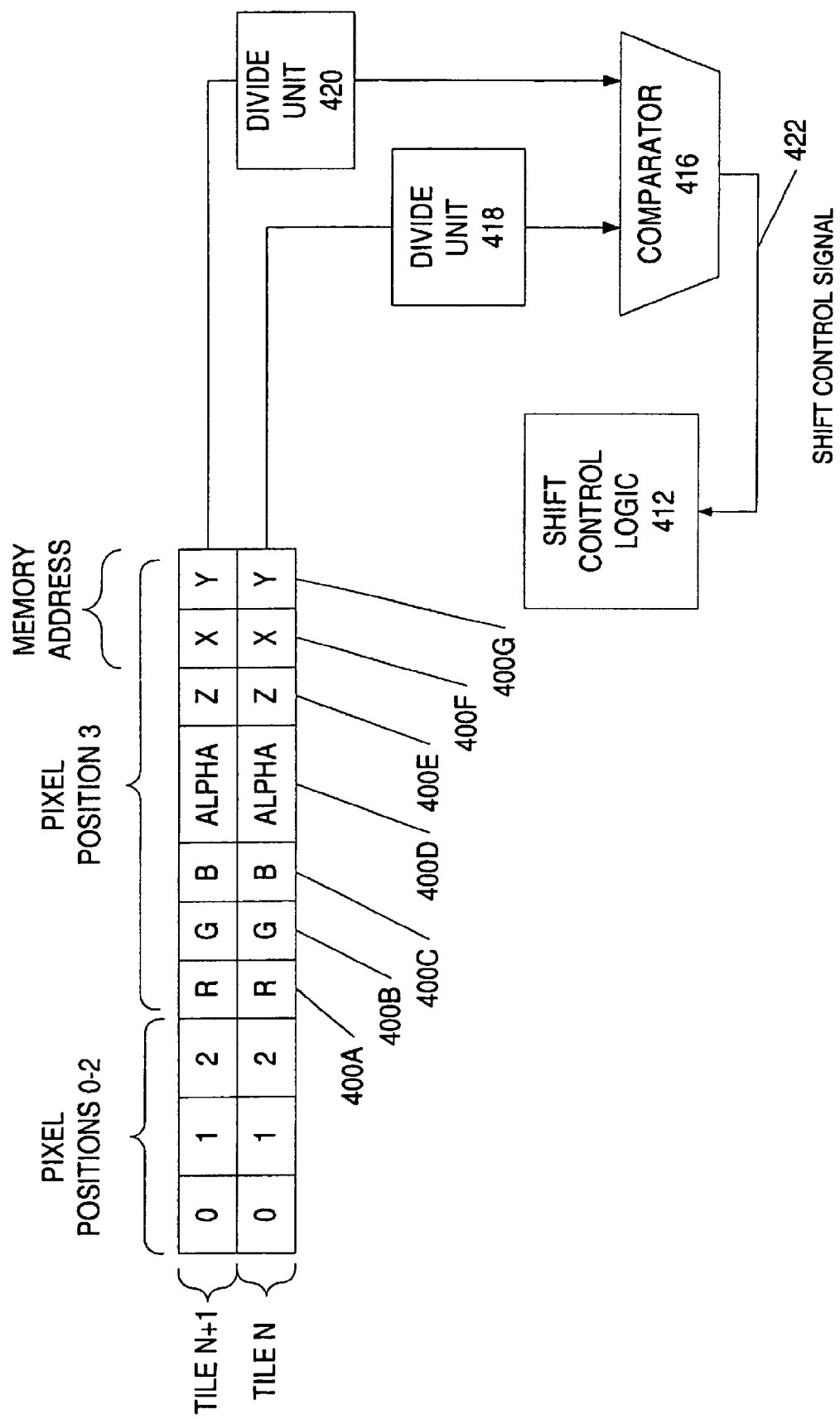
FIG. 7 is a diagram illustrating one embodiment of a FIFO memory usable in a tile merging unit for pixel packing.
Figure 8:
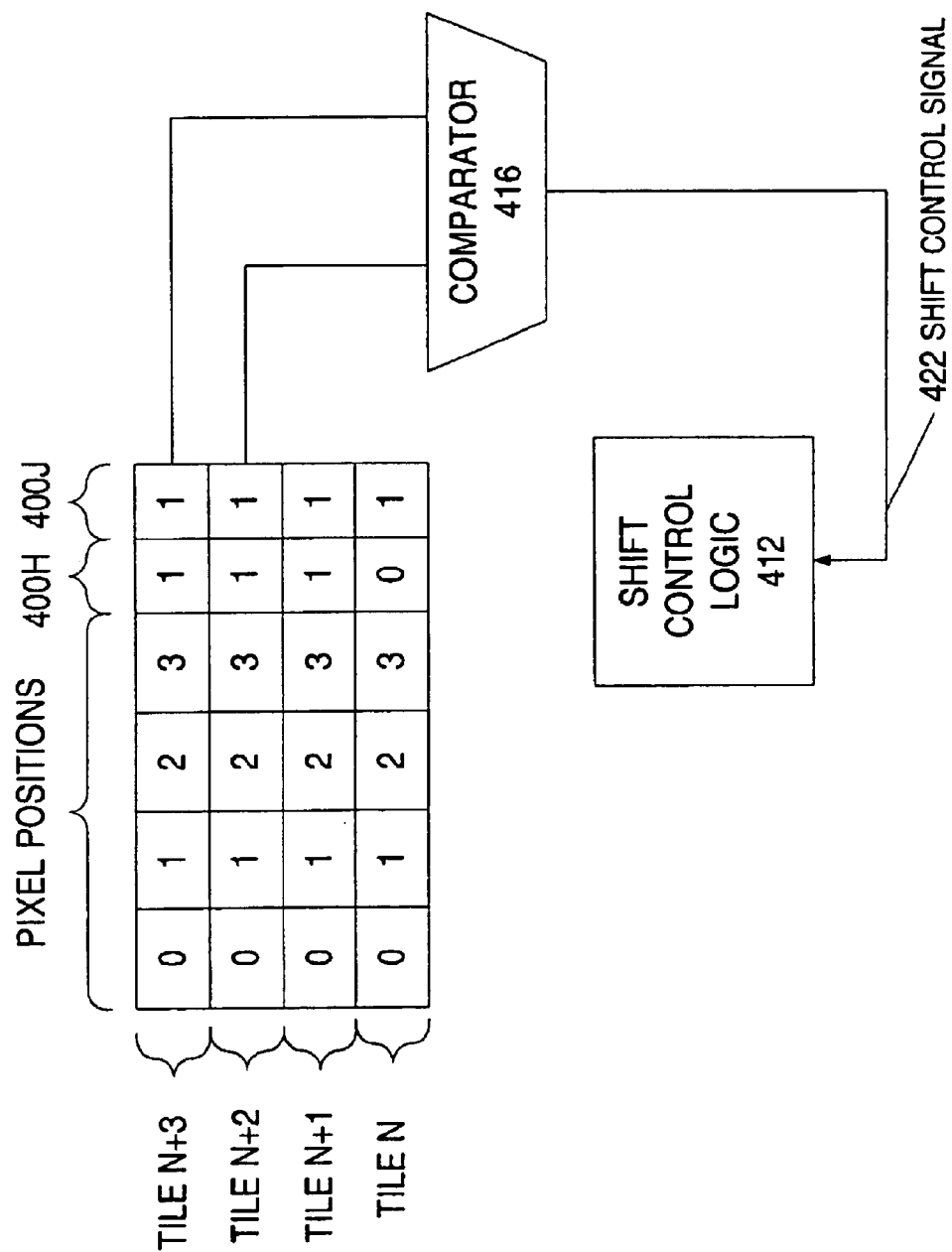
FIG. 8 is a diagram illustrating another embodiment of a FIFO memory usable in a tile merging unit for pixel packing.

Turning now to FIGS. 7 and 8, details of two embodiments of the tile merging unit's FIFO memory are shown. In FIG. 7, the tile merging unit includes a shift control logic unit 412, a comparator 416, and two divide units 418 and 420. As shown in the figure, each pixel stored in the FIFO may include color information (400A–C), transparency information (400D), depth information (400E), and position information (400F–G). A portion of the position information 400F–G may be common for the entire tile. The tile-based portion of the position information may be conveyed to divide units 418 and 420 for tiles N and N+1, respectively. In one embodiment, divide units 418 and 420 may be configured to divide the position information to determine the block to which the tile (and pixels) belong. Next, the comparator 416 may be configured to compare the two block values to determine if the tiles (and pixels) are in the same block. The comparator 416 may then generate a shift control signal 422 for shift control logic 412 that is indicative of whether or not the pixel may be shifted. Additional control logic may be used to detect the presence of valid pixels for shifting.

In FIG. 8, another embodiment of the FIFO is shown. In this embodiment, the FIFO is configured to store a block indicator 400H and a data valid indicator 400J for each tile. Block indicator 400H may be calculated earlier in the set-up and draw unit or in the tile merging unit by dividing (i) [tile x coordinate/block_x size], and (ii) [tile y coordinate/block_y size]. The block indicators for two tiles may be compared using comparator 416, which in turn generates a control signal usable by the shift control logic 412 to allow the FIFO to shift the pixels if the blocks are the same. The data valid indicators 400J may also be examined to determine whether pixels or tiles should be shifted to remove bubbles that form in the FIFO. Depending on the configuration, multiple comparators may be used to compare different combinations of tile block indicators 400H in parallel. Note, FIGS. 7 and 8 merely illustrate two examples of some of the control logic that may be used in the tile merging units. Other configurations are possible and contemplated. For example, in some embodiments the tile merging unit may include a number of individual FIFOs equal to the maximum number of pixels allowable in a single tile. Each FIFO may thus shift pixels independently as long as any of the aforementioned restrictions regarding different interleaves and common blocks that apply to the particular embodiment are met.

Turning now to FIGS. 9 and 10, tables illustrating the fill rates of one embodiment of a tile merging unit in both pixels per clock cycle and millions of triangles per second are shown. As the figures illustrate, high fill rates are achieved with deeper FIFO memories in most cases (excluding one pixel triangles). These fill rates may vary according to the actual configuration implemented and the operating frequencies.

Figure 11:
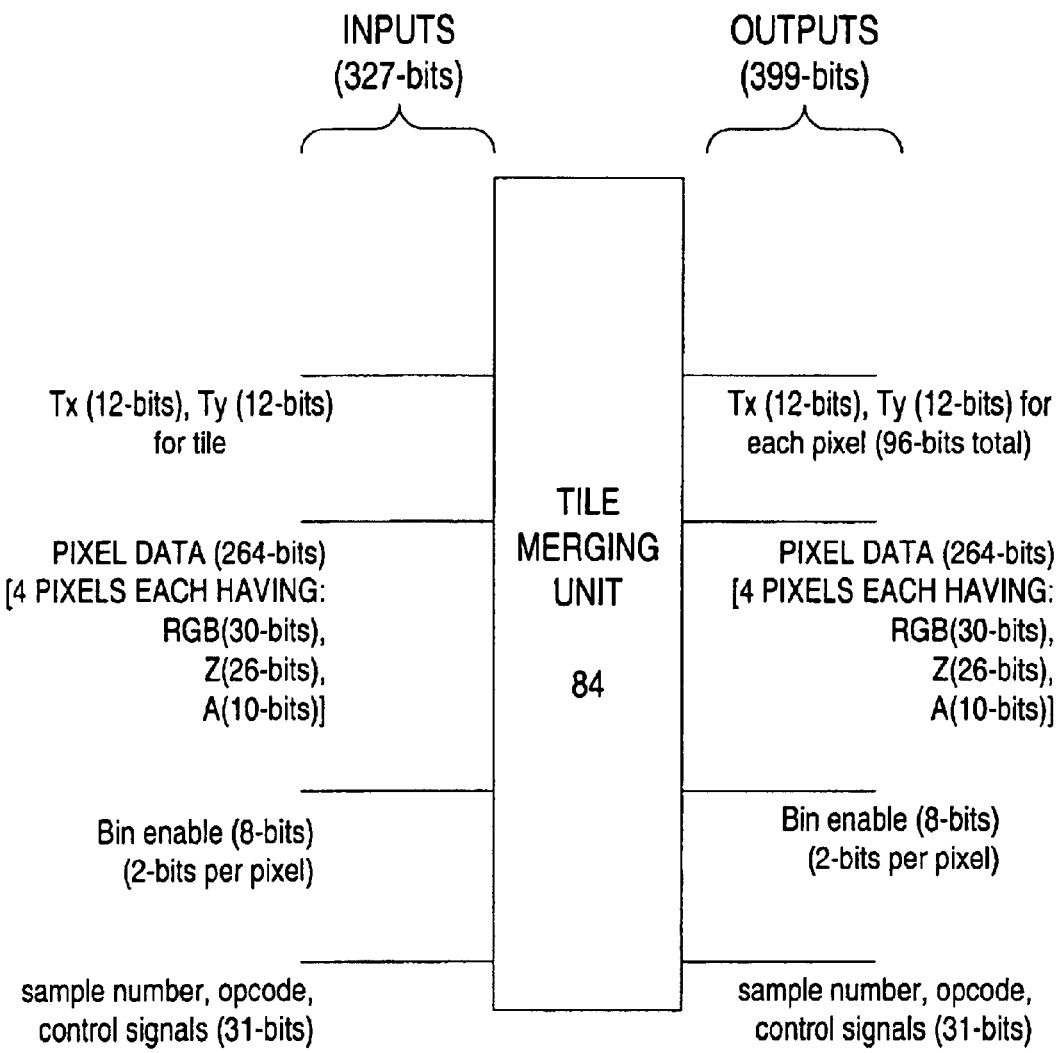
FIG. 11 is a diagram of one embodiment of an interface for tile merging unit of F, Y or Z.

Turning now to FIG. 11, a figure illustrating one embodiment of the tile merging unit interface is shown. As the figure illustrates, Tx and Ty position information is input on a per-tile basis, while it is output on a per-pixel basis. This is because the pixel packing may shift pixels, thereby making it difficult to determine where a particular pixel should be stored within the current block of memory in the frame buffer. Other inputs and outputs to the tile merging unit include 264-bits of pixel data (including 30 bits of color information, 26-bits of depth information, and 10-bits of transparency information for each of the four pixels). Control information (including opcodes and internal numbering if samples are used in lieu of pixels) may also be stored (e.g., 31-bits). Bin enable signals (e.g., 2-bits per pixel) may also be used in implementations that store pixels or samples in bins. Bins are used to store groups of pixels or samples. For example, in a super-sampled graphics system, each bin may store four samples, with sixteen samples being filtered to form each pixel. Note, the bit lengths of the interface are merely an example and may vary according to the actual implementation being used. For example, more pixels may be included in each tile, or the pixels may have greater or fewer bits of color information.

Turning now to FIGS. 12 and 13, an example of different latencies for one embodiment of a set-up and draw processor is shown. To obtain the numbers in FIGS. 12 and 13, a number of assumptions were made, including: (a) the presence of 6 set-up units, (b) a double-buffered interface between the set-up and edge walker units, (c) an edge walker unit that delivers two spans per GCLK clock cycle, (d) a span walker that delivers one 2×2 tile per GCLK clock cycle, and (e) a tile merging unit. In the Figures, SU represents one embodiment of set-up unit 68, EW represents one embodiment of edge-walker unit 70, SW represents one embodiment of span walker unit 72, and TMU represents one embodiment of tile merging unit 84.

In FIG. 12, the first row corresponds to the set-up (SU) and draw processor as a whole (e.g., set-up and draw processor 56 of FIG. 2). The second row corresponds to the latency of one embodiment of an edge walker (e.g., edge walker 70 of FIG. 2). The third row corresponds to the latency of one embodiment of a span walker (e.g., span walker 72 of FIG. 2). The fourth row corresponds to the latency of one embodiment of a fragment processor (e.g., fragment processor 82 of FIG. 2). Note that the latency of the span walker and the fragment processor is specified in pixels per clock, while the latency of the set-up and draw processor and the edge walker are specified in clocks per graphics primitive. As the figure illustrates, triangles with larger numbers of pixels (going across the table) generally result in longer latencies in the edge walker, but more efficient performance in the span walker and fragment processor.

Turning now to FIG. 13, performance of the same example graphics system is specified in terms of millions of triangles processed per second. As the figures illustrate, for this sample embodiment using 1–10 pixel non-textured, non-supersampled triangles, the set-up unit is the bottleneck. With five parallel set-up units the throughput is 73 million triangles per second at 250 MHz (GCLK). For 25 pixel triangles, the fill rate and the throughput drops to 32 million triangles per second at 250 MHz (GCLK). Note, the numbers in FIGS. 12 and 13 assume merging pixels across tiles, but no merging across primitives.

For ease of hardware implementation, the algorithm described above may be modified. For example, the FIFO memory that stores tiles from the GCLK domain may tag each interleave within a tile with a block number and a count based on the time of arrival of that tile into the FIFO memory. This may allow more efficient use of the FIFO memory's available resources. When preparing to merge tiles, the tag may be used as an additional constraint. For example, interleaves with lower tags may be constrained so that they are sent out before interleaves with higher tags. In another example, interleaves may be constrained to merge only with other interleaves that have the same block tag.

Figure 14:
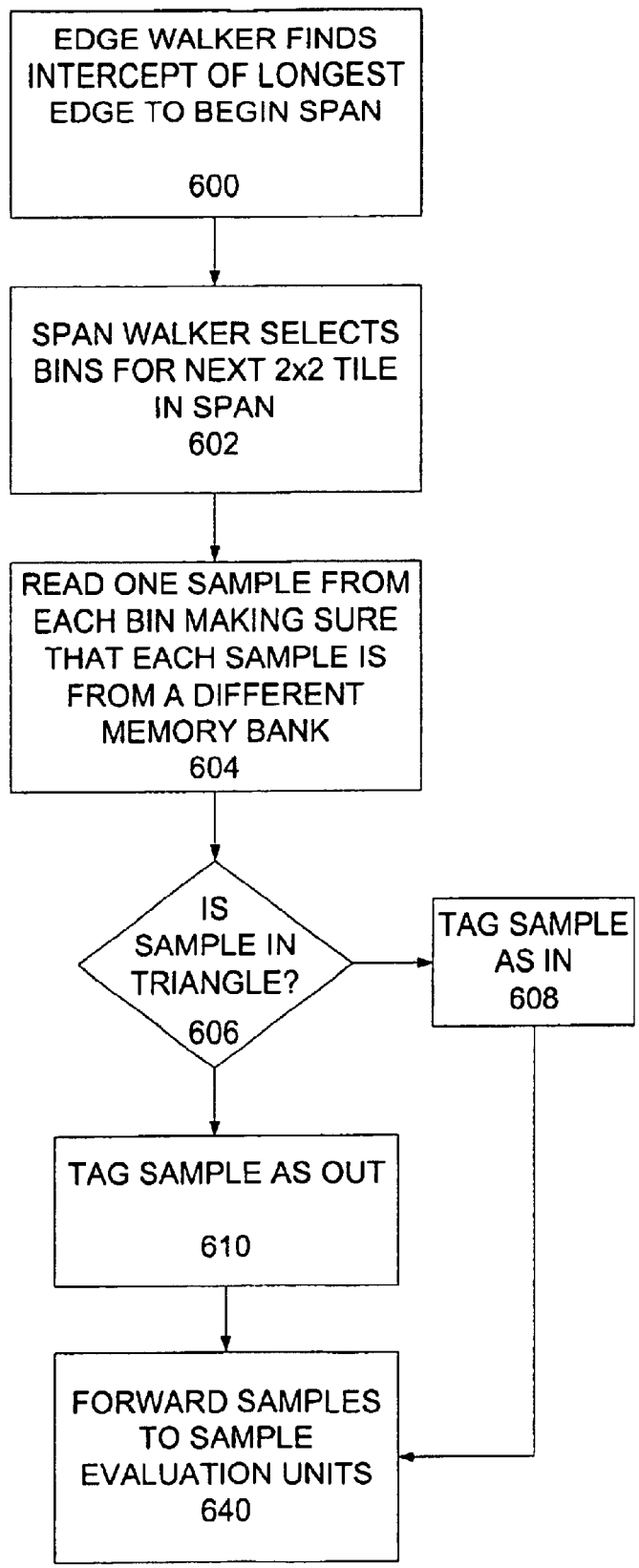
FIG. 14 depicts one embodiment of a method for rasterizing samples.

Turning to FIG. 14, one embodiment of a method for rasterization is shown. In this embodiment, the method begins with edge walker receiving 70 receiving vertex information describing a geometric primitive (e.g., 3 vertices forming a triangle). The edge walker 70 is configured to find intercepts along the longest edge of the geometric primitive. These intercepts may be used to begin the span walking process (step 600). Next, span walker 72 is configured to select bins corresponding to the next 2×2 tile in the span (step 602). Generally, span walker 72 may be configured to select an N×M tile of sample bins at least partially intersecting the geometric primitive. N and M may both be positive integers. Preferably, at least one of N and M are greater than one (e.g., N=2 and M=2). As noted above, span walker 72 may be configured to traverse the geometric primitive in the direction of the geometric primitive's minor axis. Span walker 72 may also be configured to select tiles for multiple spans (e.g., 2 spans) during a single cycle. Thus, span walker 72 may be configured to output tiles of bins to sample generator 74 and texture pipe 80 (see FIG. 2).

As used herein, a "bin" is a grouping of samples that share a common minimum possible x position, maximum possible x position, minimum possible y position, and maximum possible y position. For example, sample positions may be specified as offsets or deltas from bin position coordinates. Since samples fall within a predetermined minimum or maximum offset from the bin position, a fixed number of bits may be used to specify the offset for each sample in a particular bin. Advantageously, the use of bins may potentially simplify the storage and manipulation of samples in a super-sampled graphics system, particularly in embodiments where the sample offsets are stochastic.

After receiving the tile of bins from span walker 72, sample generator 74 may be configured to read one sample from each bin in the tile of bins (step 604). In the process of reading the samples, sample generator 74 may be configured to insure that each sample read during a particular cycle corresponds to a different memory bank. As noted above, frame buffer 58 may be configured with multiple memory banks. In order to prevent one sample from blocking another sample during a write cycle, sample generator 74 may be configured to select samples that are from different memory banks for each cycle. Advantageously, this may prevent one sample from blocking another sample during a write or store to frame buffer 58.

Sample generator 74 may also be configured to determine whether each particular selected sample is inside the particular geometric primitive being rendered (step 606). If the particular sample is inside the primitive, sample generator 74 may be configured to tag or identify the sample as being inside the primitive (step 608). Conversely, if sample generator 74 determines that the particular sample is outside the primitive, the sample generator 74 may be configured to tag or identify the sample as being outside the primitive (step 610). For example, in one embodiment sample generator 74 may be configured to append a one bit tag to each sample that identifies whether the sample is inside or outside the primitive. Next, the sample generator 74 may be configured to forward the samples (along with their tag information) to sample evaluator 76 (step 640). Note, in the preferred embodiment, there are multiple sample evaluation units within sample evaluator 76 (e.g., four sample evaluation units).

In some embodiments, a variable number of samples may be stored per bin. For example, in peripheral areas of screen space, a lower number of samples per bin may be used (one sample per bin), whereas a higher number of samples per bin (e.g., 16 samples per bin) may be used in more central or "important" areas of screen space. In other embodiments, the number of samples per bin may be fixed (e.g., 8 samples per bin). In some embodiments of graphics system 50, each bin may correspond to a particular pixel that is displayed on a display device. In other embodiments, samples from multiple bins may be filtered together to form individual pixels. In these embodiments, there may not be a one-to-one correlation between bins and samples.

Figure 15:
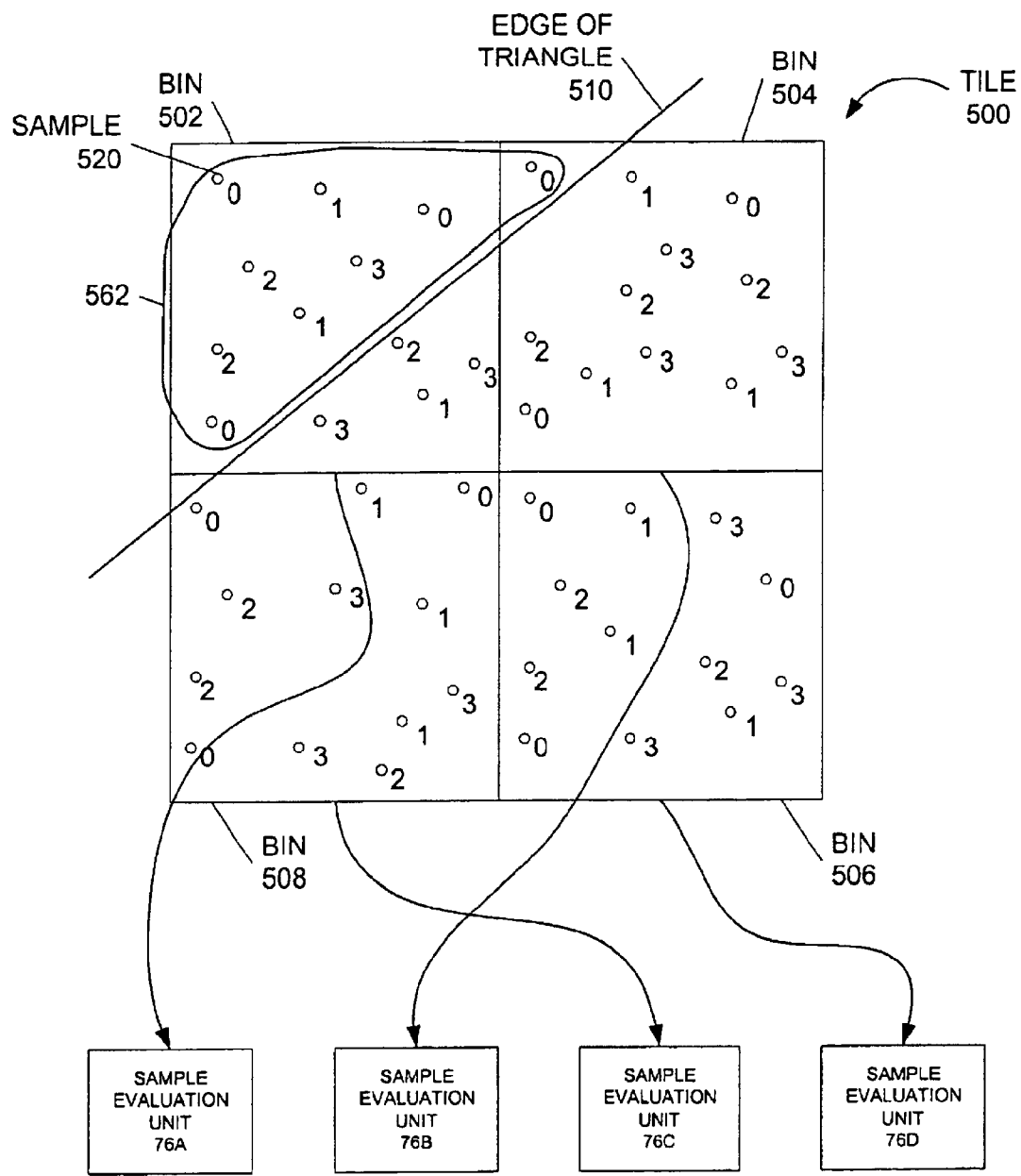
FIG. 15 depicts additional details of one embodiment of a method and apparatus for rasterizing samples.

Turning now to FIG. 15, one embodiment of a method for rasterizing graphics data is shown. In this embodiment, one edge of a triangle 510 is shown. In this example, span walker 72 has placed tile 500 (including bins 502, 504, 506, and 508) as shown in the figure with a number of samples in bin 502 and 504 being outside triangle 510. These samples are indicated by border 562. As described above, these samples may be tagged by sample generator 74 as being outside triangle 510. Thus, these samples will not end up being rendered as part of triangle 510.

As shown in the figure, in one embodiment, sample generator 74 may be configured route samples from each bin in tile 500 to a particular sample evaluation unit. For example, samples from bin 502 may all be routed to sample evaluation unit 76A, while samples from bin 504 may be routed to sample evaluation unit 76B. As shown in the figure, each sample may be accompanied by a tag (e.g., 0, 1, 2, or 3). The tag may indicate which memory bank in frame buffer memory 58 we sample will eventually be stored into. Sample generator 74 and/or sample evaluator 76 may be configured to interleave the samples selected from each bin during a particular clock cycle to insure that only one sample from each of the four memory banks 0 through 3 are selected. As noted above, this may advantageously reduce or avoid situations in which one sample may block another sample from being stored to the frame buffer during a particular clock cycle. Once the samples are routed to sample evaluation unit 76A through 76D, the samples may be rendered. For example, color, transparency (alpha), and depth information may be interpolated for each sample based on the color, transparency, and depth information corresponding to each of the vertices from the primitive being rendered (e.g., triangle 510).

Once the samples are rendered, they may be provided to texture environment unit 78 for the application of texture information from texture pipe 80. Next, the samples may be provided to fragment processor 82, and then tile merging unit 84 for eventual storage in frame buffer memory 58. In one embodiment, samples may be stored in a first portion of frame buffer memory 58, while pixels are stored in a second portion of frame buffer memory 58. The samples may be read out from the frame buffer memory, filtered, and then stored back into the second portion of frame buffer memory 58. The pixels may then be read out of frame buffer memory 58 and displayed on a display device. In another embodiment, samples may be stored in frame buffer memory 58 and then read out and filtered at some later point in time for display on a display device.

Figure 16:
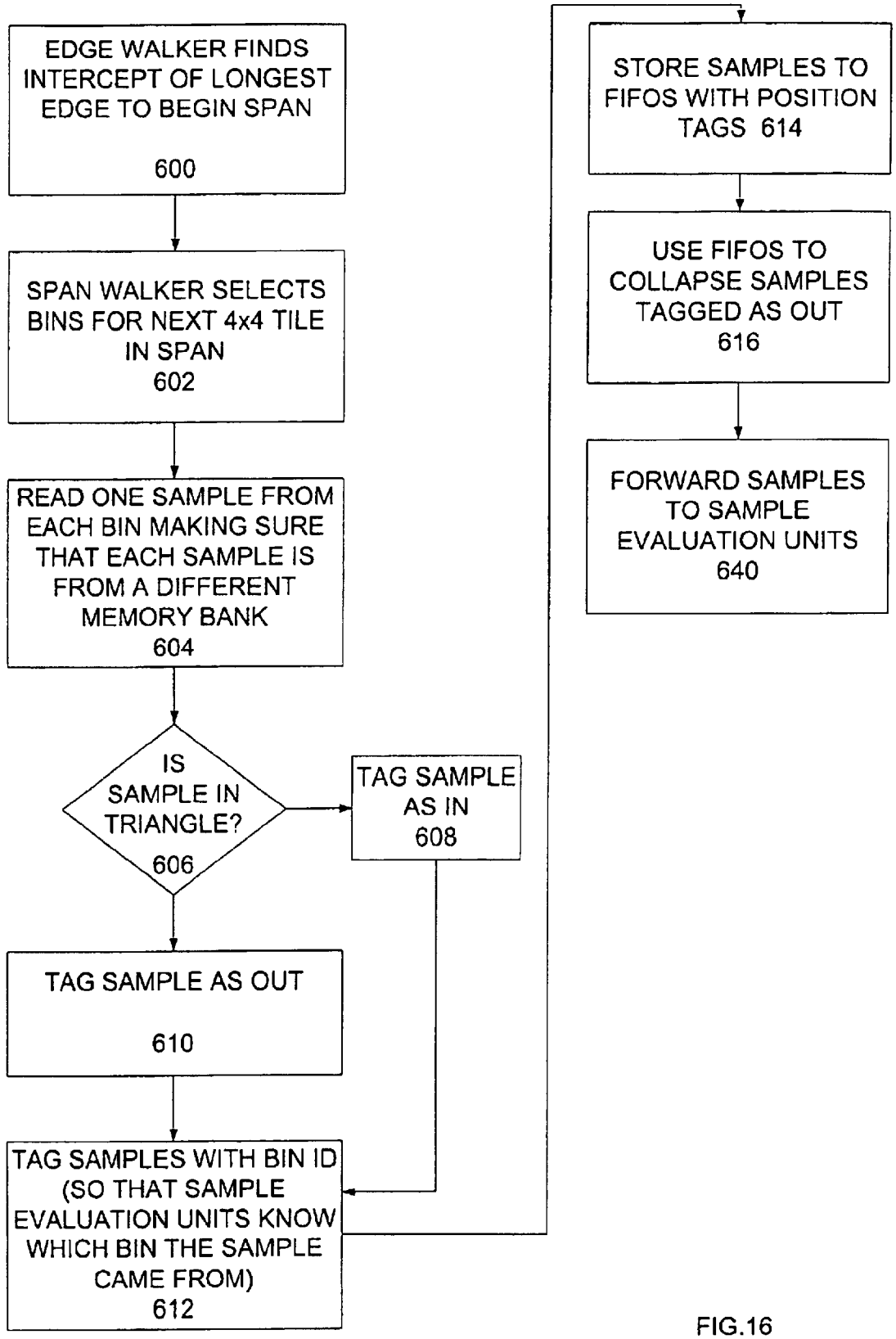
FIG. 16 depicts another embodiment of a method for rasterizing samples.

Turning now to FIG. 16, another embodiment of a method for rasterizing graphics data is shown. In this embodiment, steps 600 through 610 are performed in a similar manner to those described in connection with FIG. 14. However, once these samples have been identified and tagged as either inside or outside the primitive being rendered, samples may also be tagged with a bin ID (step 612). Advantageously, this bin ID tag may be used to identify which bin each particular sample came from. Next, the samples may be stored to FIFOs with their position tags and their bin ID tags (step 614). Advantageously, the FIFOs may be used to collapse out samples that are tagged as being outside the primitive (step 616). Next, the collapsed samples may be forwarded to the plurality of sample evaluation units for rendering (step 640).

Figure 17:
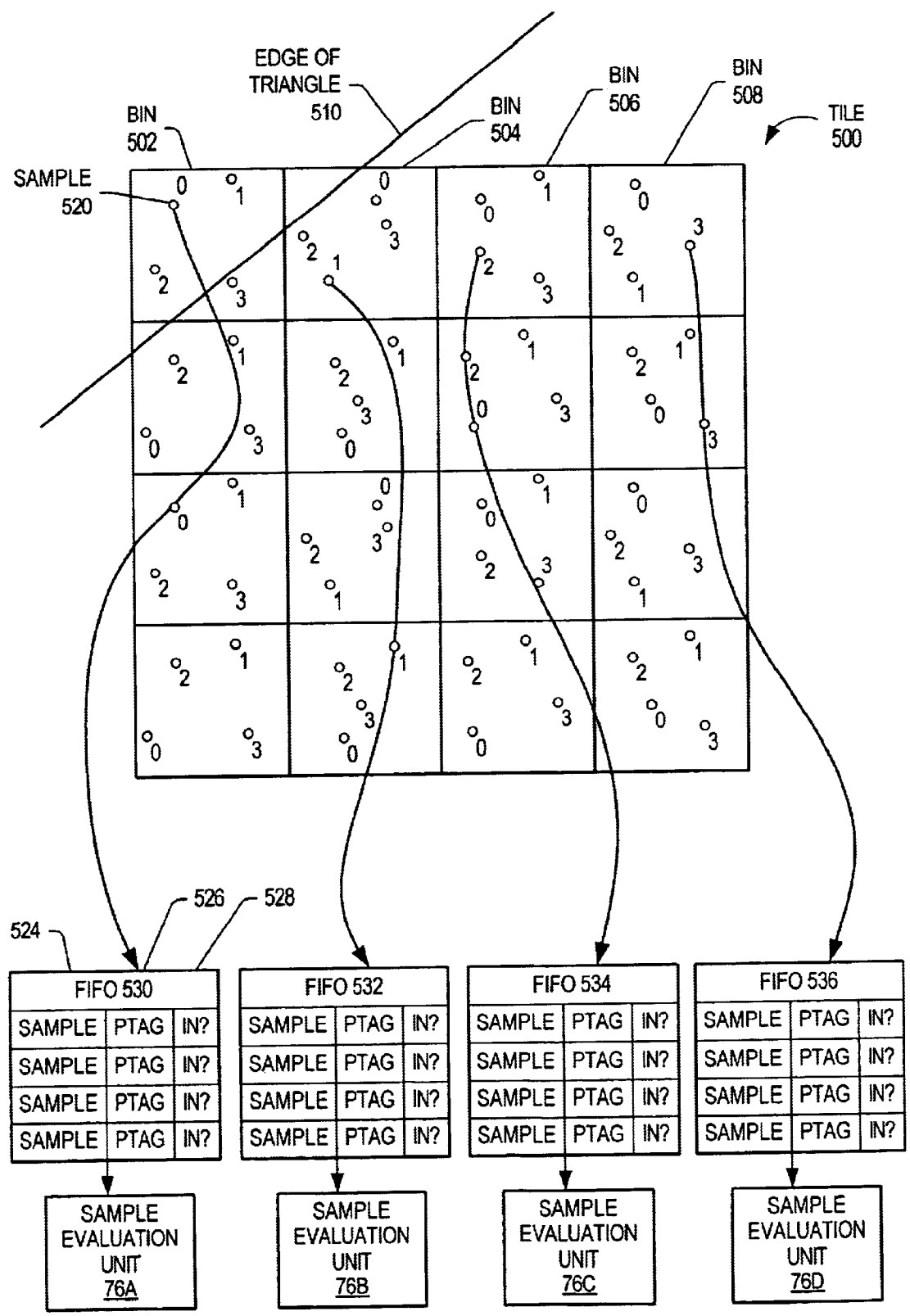
FIG. 17 depicts more details of one embodiment of a method and apparatus for rasterizing samples.

Turning now to FIG. 17, another embodiment of a system and method for rasterization of graphics data is shown. In this embodiment, a 4×4 array of bins are selected as tile 500. As with the previously disclosed embodiments, each bin may store a variable number of samples (e.g., 2 samples or 16 samples). As previously described, each sample may be tagged with a memory bank ID (e.g., tags 0, 1, 2, 3, as shown in the figure) and a bin ID tag. Note, the number of bits allocated to the bin ID tag may vary depending on the number of samples per bin and bins per tile. For example, a 16-bit ID tag may be used in some embodiments if there are enough bins to warrant this size. As shown in the figure, samples from each bin in the tile may be selected for storage to FIFO memories 530 through 536. FIFOs 530 through 536 may be configured to collapse out samples that have been tagged as being outside of triangle 510. Advantageously, this may improve the utilization of sample evaluation units 76A through 76D by reducing the number of idle cycles the several evaluation units spend on samples that are outside of triangle 510.

In one embodiment, sample generator 74 may be configured to select samples corresponding to different memory banks (as identified by their memory bank ID tag) in order to prevent memory blockage from occurring further down the rendering pipeline. This is illustrated in the figure which illustrates one write cycle to FIFOs 530 through 536 from bins 502 through 508. Note, in other embodiments sample generator 74 may be configured to write one sample from each bin in tile 500 to FIFOs 530 through 536 in a single cycle (e.g., one clock cycle). In other embodiments, sample generator 74 may be configured to write one sample from a subset from the bins in tile 500 per clock cycle.

Sample generator 74 may be configured to cycle through the bins in tile 500 selecting one sample from each bin, wherein each selected sample corresponds to a different memory bank. As shown in the figure, each of FIFO memories 530 through 536 may comprise storage for a plurality of samples 524, a plurality of memory bank and bin ID tags 526, and a plurality of in/out tags 528. In/out tag 526 may be used to indicate whether or not the sample is inside or outside of the primitive being rendered. Tags 526 and 528 may also be used by FIFOs 530 through 536 in determining if and when samples may be shifted or collapsed to remove invalid or empty samples.

In some embodiments, even larger tiles may be generated (e.g., 4×4 tiles corresponding to 16 pixels). By generating larger tiles, fragmentation may be reduced to improve datapath utilization. For example, each cycle the rasterization pipeline may be configured to calculate 4 adjacent spans (e.g., along the minor axis of the primitive). If more than the maximum supported number of pixels (e.g., 4 pixels per cycle) survive the fragmentation, then the pixels may be processed in the datapath in groups of four, cycle after cycle, until all the valid pixels are processed. Then, the next 4×4 tile may be processed. Advantageously, these larger tiles may improve utilization in some embodiments (e.g., an improvement in utilization from 2.2 pixels per tile to 5.1 pixels per tile may be seen in some implementations).

In order to ensure that the sample evaluator has enough tiles allover over-evaluation (e.g., 16 samples per cycle while the remainder of the pipeline can only handle 4 samples per cycle), the edge walker and sample generator may be configured to "look-ahead" by checking to see if future tile candidates (e.g., 2 tiles ahead) will still be within the stripe. In one embodiment, this look-ahead calculation relies on the calculation of bin enables. This embodiment is described in greater detail below.

Bin Enable Bits

In one embodiment, the interface between the span walker 72 and sample generator 74 may be implemented as indicated in Table 1.

TABLE 1

| Primitive | Data0 | Data1 | Data2 |
| --- | --- | --- | --- |
| Polygon | (20'bx,tx[11:0]) | (20'bx,ty[11:0]) | (28'bx,be[3:0]) |
| Rectangle | (20'bx,tx[11:0]) | (20'bx,ty[11:0]) | (28'bx,be[3:0]) |
| Br Line | (20'bx,tx[11:0]) | (20'bx,ty[11:0]) | (28'bx,be[3:0]) |

In Table 1, "be" represents the bin enables, (tx,ty) represent the upper-left hand corner of the tile, "tx[11:0]" represents the x-coordinate of the tile, ty[11:0] represents the y-coordinate of the tile, and bx represents the x-coordinate of the bin. As noted above, the span walker may provide edge information to the sample generator to allow the sample generator to generate/select samples for the primitive being rendered.

Figure 18:
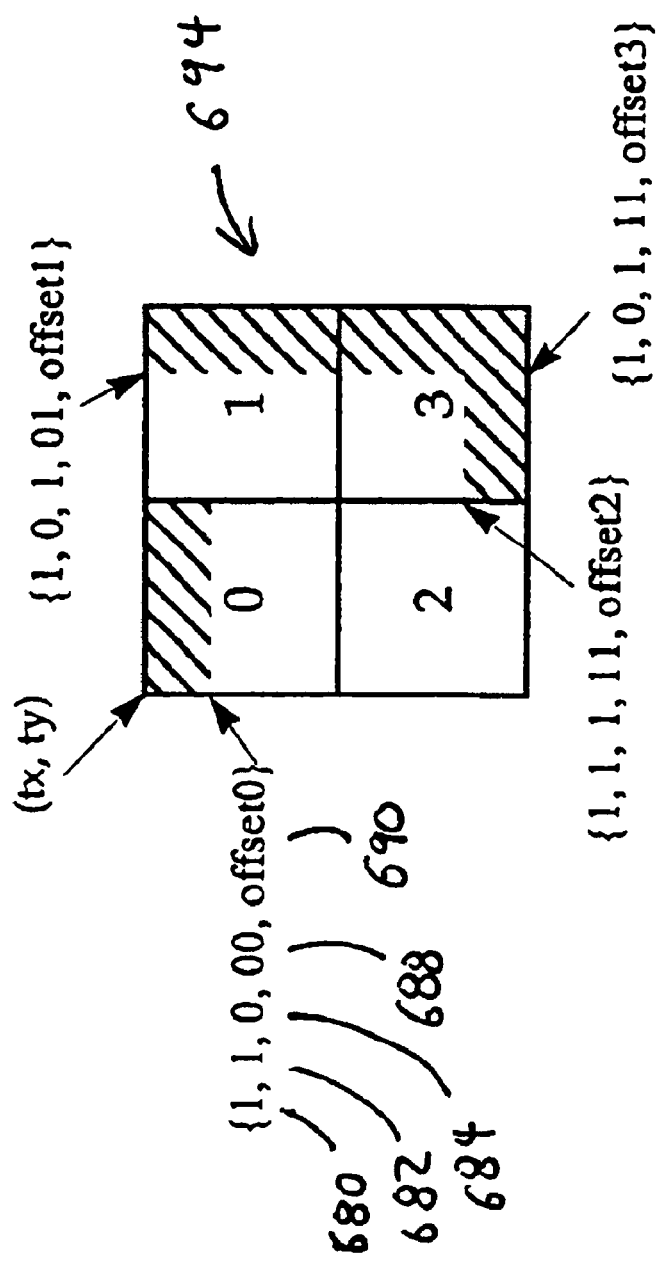
FIG. 18 depicts one example of a tile.

Turning now to FIG. 18, one example of a tile of bins 694 is shown. In this embodiment, the tile is a 2×2 array of bins, numbered 0 through 3. A bin enable is calculated for each bin in the tile. The bin enables are calculated based on (i) the scan direction, (ii) the state of the super-sampling (i.e., whether or nor supersampling is enabled), and (iii) the block boundary condition. Each of the edges contained in the stripe (e.g., up to 3 for triangles, 2 for other primitives such as line) have a contribution to the bin enables. The 4-bit bin enables (BE) from each edge are logically AND'ed together with the bin enables from the block boundary condition ($BE_{BB}$) to form the final bin enable, as shown in the following equations:

BE={be3, be2, be1, be0}

$BE_{BB}$=(tn % BN==0)?(4'b0101):(4'b1111)

BE=$BE_{BB}$ & $BE_{NS}$ & $BE_{SUB1}$ (& $BE_{SUB2}$)

In these equations, "&" represents a logical AND operation, and "$BE_{NS}$" represents the non-super-sampled state.

In one embodiment, the 11-bit edge hugging information shown in FIG. 18 may include the following: a valid bit 680 indicating whether or not the edge hugging information is valid, a major axis indicator bit 682 (e.g., whether the edge hugging is horizontal or vertical), an accept bit 684 indicative of which side of the edge hugging is the inclusion area (e.g., right/bottom or left/top), a 2-bit code 688 indicative of which of the bins the edge-hugging information belongs to, and a 6-bit offset 690 measured from the left/top corner of the bin. Note, this example represents one embodiment, and other configurations are possible and contemplated. For example, in embodiments that utilize larger tiles, more bits may be allocated to indicate to which of the bins the edge-hugging information belongs.

Turning now to FIG. 19, two examples of bin enable calculations for a span oriented along the triangle's major axis (i.e., the n-axis) are shown. The first example 700 illustrates scanning for a span along the positive n-axis (i.e., the starting vertex on the left), while the second example 702 illustrates scanning for a span along the negative n-axis (i.e., the starting vertex is on the right). The column labeled "NSS" represents calculations for non-super-sampled bins, and the column labeled "SS" represents calculations for super-sampled bins. As the equations illustrate, non-super-sampled bins utilize the upper left corner of the bin as the sample point, while super-sampled bins compare against the maximum or minimum bin coordinates. In the figures, "tn", "tn−1", and "tn+1" represent bin coordinates along the n-axis, and ns1, ns2, ne1, and ne2 represent triangle edge intercept coordinates along the n-axis at bin boundaries along the j-axis.

Figure 20:
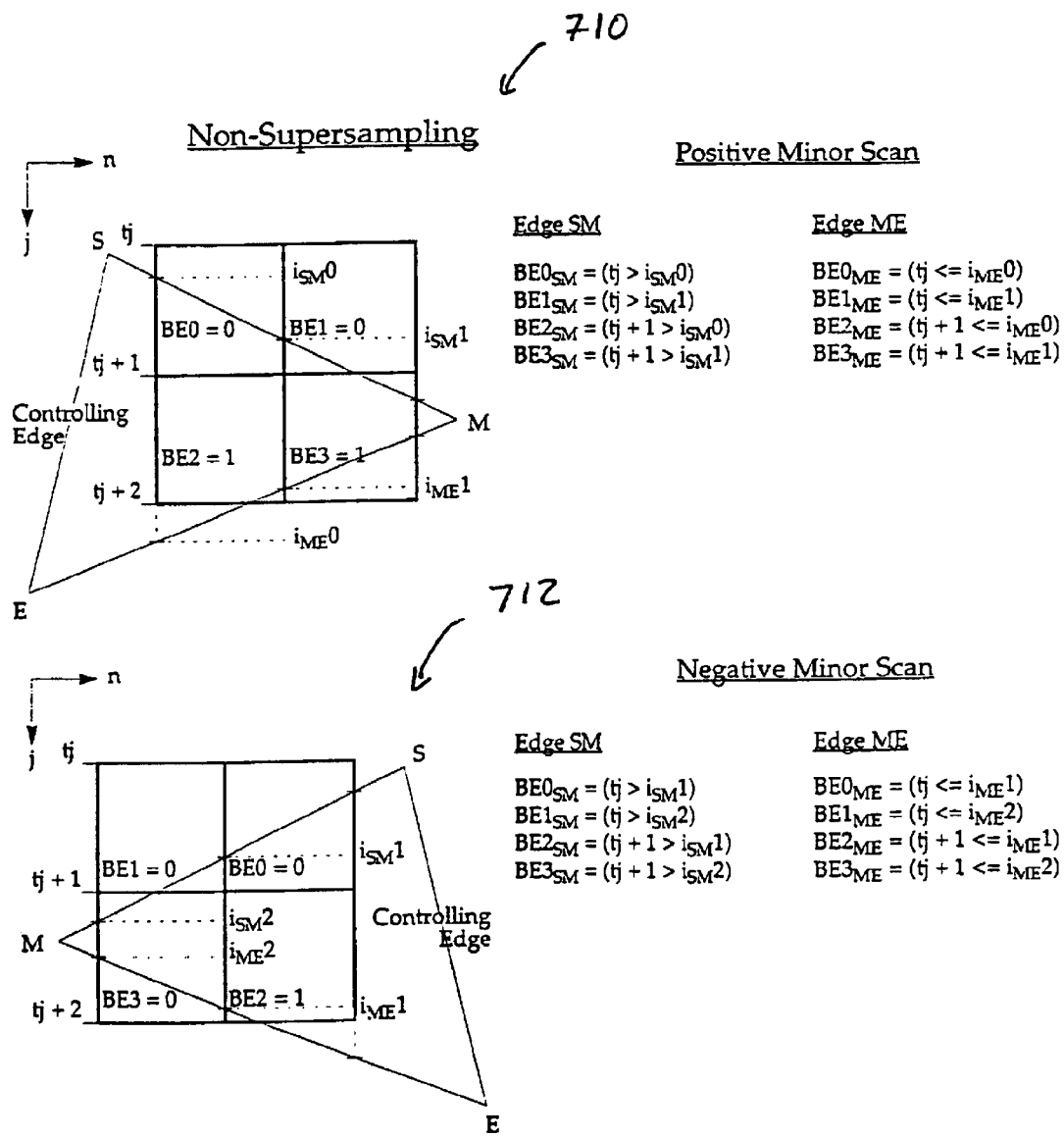

Turning now to FIG. 20, two examples of bin enable calculations for a non-super-sampled span of bins oriented along the triangle's minor axis (i.e., the j-axis) are shown. The first example 710 illustrates scanning for a span along the positive j-axis (i.e., the controlling edge on the left), while the second example 712 illustrates scanning for a span along the negative j-axis (i.e., the controlling edge on the right). S, M, and E represent triangle vertices, and "tj", "tj−1", and "tj+1" represent bin coordinates along the j-axis. The coordinates $i_{SM}0$, $i_{SM}1$ and $i_{SM}2$ represent the intersection point of the SM triangle edge and the edge of bins 0, 1, and 2, respectively. The coordinates $i_{ME}0$, $i_{ME}1$ and $i_{ME}2$ represent the intersection of the ME triangle edge and the edge of bins 0, 1, and 2, respectively. As the equations illustrate, non-super-sampled bins utilize the upper left corner of the bin as the sample point.

Figure 21:
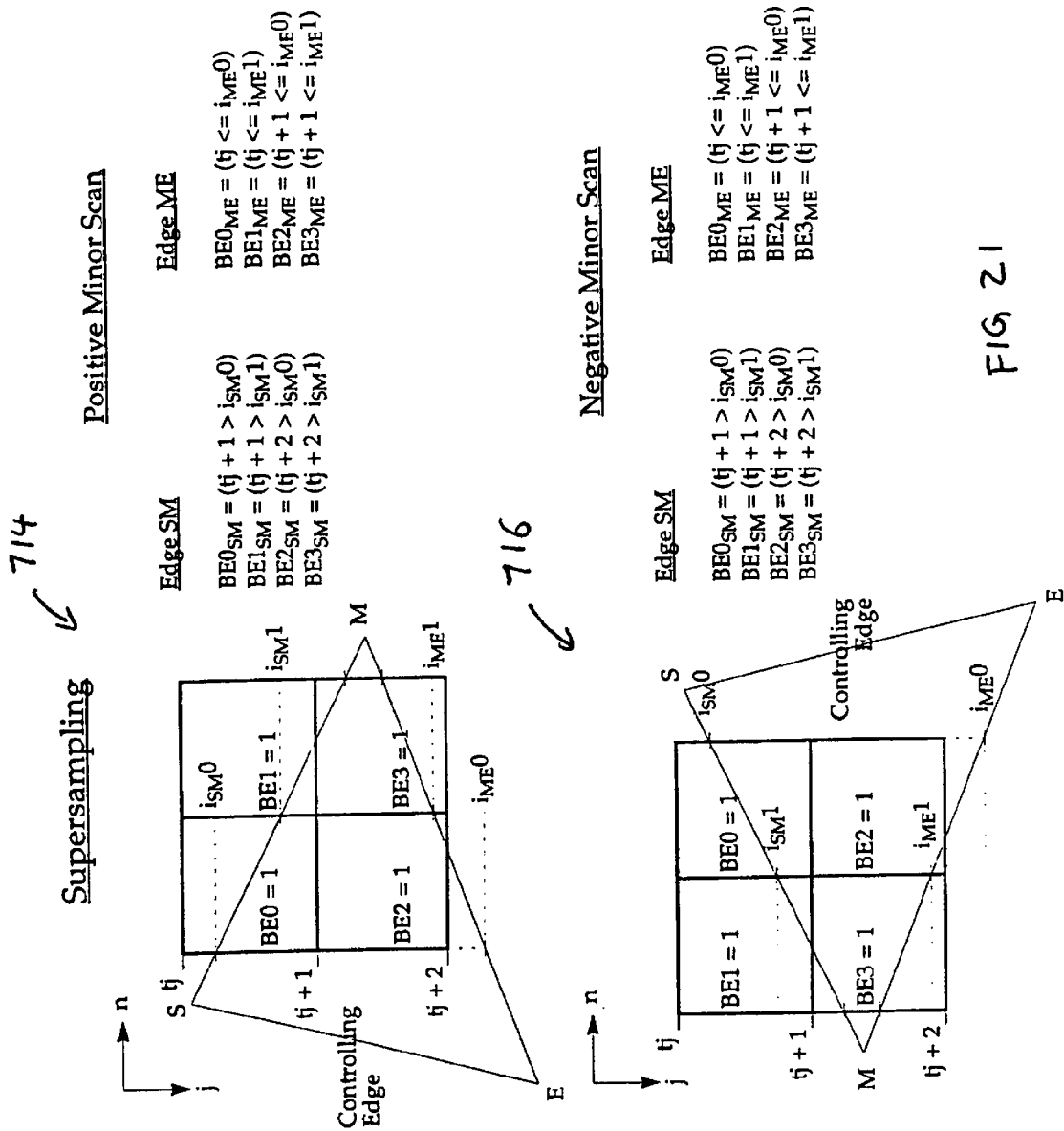

Turning now to FIG. 21, two examples of bin enable calculations for a super-sampled span of bins oriented along the triangle's minor axis (i.e., the j-axis) are shown. The first example 714 illustrates scanning for a span along the positive minor axis (i.e., the controlling edge on the left), while the second example 712 illustrates scanning for a span along the negative minor axis (i.e., the controlling edge on the right). S, M, and E represent triangle vertices, and "tj", "tj−1", and "tj+1" represent bin coordinates along the j-axis. The coordinates $i_{SM}0$, $i_{SM}1$ and $i_{SM}2$ represent the intersection point of the SM triangle edge and the edge of bins 0, 1, and 2, respectively. The coordinates $i_{ME}0$, $i_{ME}1$ and $i_{ME}2$ represent the intersection point of the ME triangle edge and the edge of bins 0, 1, and 2, respectively. As the equations illustrate, super-sampled bins utilize comparisons against the maximum or minimum bin coordinates.

A system and method for improved rasterization of graphics data has been disclosed. While the embodiments described herein and illustrated in the figures have been discussed in considerable detail, other embodiments are possible and contemplated. It should be understood that the drawings and detailed description are not intended to limit the invention to the particular forms disclosed, but on the contrary, the intention is to cover all modifications, equivalents, and alternatives falling within the spirit and scope of the present invention as defined by the appended claims.

What is claimed is:

1. A method for processing graphics data in a rendering pipeline, the method comprising:
   (a) receiving a geometric primitive;
   (b) selecting a tile of sample bins at least partially intersecting the geometric primitive;
   (c) selecting K samples from the tile for a first evaluation cycle, wherein K is a positive integer greater than one;
   (d) evaluating the K samples during the first cycle, wherein the evaluating includes determining which of the K samples are valid, wherein the valid samples are inside the geometric primitive;
   (e) grouping the valid samples into one or more sets of J samples, wherein J is a positive integer less than K;
   (f) forwarding at least one set per clock cycle to subsequent stages of the rendering pipeline; and
   (g) repeating (c) through (e) until all samples in the tile have been evaluated and all valid samples have been forwarded, wherein a different set of K samples is selected from the tile in each repetition of (c) through (e).

2. The method of claim 1, wherein (d) includes individually tagging the selected samples as either inside or outside the geometric primitive.

3. The method of claim 1, wherein (e) includes storing the sets of J samples to a FIFO memory.

4. The method of claim 1, wherein the samples include color, depth, and alpha information.

5. The method of claim 1, further comprising filtering the samples to form pixels, wherein the pixels are displayable to form an image.

6. The method of claim 1, wherein K equals 16 and J equals 4.

7. A graphics system for processing graphics data, wherein the graphics system comprises:
   a memory configured to store the graphics data, wherein the graphics data comprises one or more geometric primitives; and
   a set-up and draw processor configured to:
      (a) select a tile of sample bins at least partially intersecting the geometric primitive;
      (b) select K samples from the tile for a first evaluation cycle, wherein K is a positive integer greater than one;
      (c) evaluate the K samples during the first cycle, wherein the evaluating includes determining which of the K samples are valid, wherein the valid samples are inside the geometric primitive;
      (d) group the valid samples into one or more sets of J samples, wherein J is a positive integer less than K; and
      (e) forward at least one set per clock cycle to subsequent stages of the rendering pipeline, wherein the set-up and draw processor is configured to repeat (b) through (e) until all samples in the tile have been evaluated and all valid samples have been forwarded, wherein a different set of K samples are selected from the tile in each repetition of (b) through (e).

8. The system of claim 7, wherein (d) includes individually tagging the selected samples as either inside or outside the geometric primitive.

9. The system of claim 7, wherein (e) includes storing the sets of J samples to a FIFO memory.

10. The system of claim 7, wherein the samples include color, depth, and alpha information.

11. The system of claim 7, further comprising filtering the samples to form pixels, wherein the pixels are displayable to form an image.

12. The system of claim 7, wherein K equals 16 and J equals 4.

13. The system of claim 7, wherein the subsequent pipeline stages include at least a texture environment stage, and a fragment processor stage.

14. A graphics system comprising:

a means for storing graphics data, wherein the graphics data comprises one or more geometric primitives; and a means for selecting a tile of sample bins at least partially intersecting the geometric primitive;

a means for selecting K samples from the tile for a first evaluation cycle, wherein K is a positive integer greater than one;

a means for evaluating the K samples during the first cycle, wherein the evaluating includes determining which of the K samples are valid, wherein the valid samples are inside the geometric primitive;

a means for grouping the valid samples into one or more sets of J samples, wherein J is a positive integer less than K; and a means for forwarding at least one set per clock cycle to subsequent stages of the rendering pipeline; and means for repeating said selecting K samples, said evaluating, said grouping and said forwarding until all samples in the tile have been evaluated and all valid samples have been forwarded, wherein a different set of K samples are selected from the tile in each repetition of said selecting K samples, said evaluating, said grouping and said forwarding.

15. The system of claim 14, wherein said evaluating also includes individually tagging the selected samples as either inside or outside the geometric primitive.

16. The system of claim 14, wherein said forwarding includes storing the sets of J samples to a FIFO memory.

17. The system of claim 14, wherein the samples include color, depth, and alpha information.

18. The system of claim 14, further comprising a means for filtering the samples to form pixels, wherein the pixels are displayable to form an image.

19. The system of claim 14, wherein K equals 16 and J equals 4.

20. The system of claim 14, wherein the geometric primitives are triangles, lines or dots.

21. The method of claim 6, wherein the tile is a 4×4 square array of sample bins.

22. The method of claim 21, wherein each sample bin of the tile contains 16 samples.

23. The method of claim 22, wherein each set of J samples corresponds to J different memory banks in a frame buffer memory.

* * * * *